(12) United States Patent
Kitazawa et al.

(10) Patent No.: US 12,517,400 B2
(45) Date of Patent: Jan. 6, 2026

(54) DISPLAY DEVICE

(71) Applicant: SHARP KABUSHIKI KAISHA, Sakai (JP)

(72) Inventors: Tazuko Kitazawa, Sakai (JP); Yoshihiro Ueta, Sakai (JP); Eiji Satoh, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 210 days.

(21) Appl. No.: 18/273,129

(22) PCT Filed: Jan. 22, 2021

(86) PCT No.: PCT/JP2021/002313
§ 371 (c)(1),
(2) Date: Jul. 19, 2023

(87) PCT Pub. No.: WO2022/157945
PCT Pub. Date: Jul. 28, 2022

(65) Prior Publication Data
US 2024/0103323 A1    Mar. 28, 2024

(51) Int. Cl.
*G02F 1/1343* (2006.01)
*G02F 1/1335* (2006.01)
*G02F 1/139* (2006.01)

(52) U.S. Cl.
CPC .. *G02F 1/134381* (2021.01); *G02F 1/133531* (2021.01); *G02F 1/1396* (2013.01)

(58) Field of Classification Search
CPC ......... G02F 1/134381; G02F 1/133531; G02F 1/1396; G02F 2201/44; H01L 27/3232; H01L 27/3225; H01L 27/3267; H10K 59/50; G09G 2300/023
See application file for complete search history.

(56) References Cited

U.S. PATENT DOCUMENTS

| 2013/0194167 A1 | 8/2013 | Yun et al. |
| 2020/0183204 A1 | 6/2020 | Yoshida |

FOREIGN PATENT DOCUMENTS

| JP | 2006-276089 A | 10/2006 |
| JP | 2013-156635 A | 8/2013 |
| JP | 2019091640 A * | 6/2019 |
| WO | 2019035464 A1 | 2/2019 |

* cited by examiner

*Primary Examiner* — Jia X Pan
(74) *Attorney, Agent, or Firm* — ScienBiziP, P.C.

(57) ABSTRACT

A display device includes: a light-emitting element including a first electrode and a second electrode overlapping each other in a plan view, and a light-emitting layer placed between the first electrode and the second electrode; a third electrode capable of forming an electrical field between the second electrode and the third electrode; and an optical adjustment element overlapping the light-emitting layer in a plan view and having light transmittance that changes in accordance with a potential difference between the second electrode and the third electrode.

3 Claims, 19 Drawing Sheets

(a)
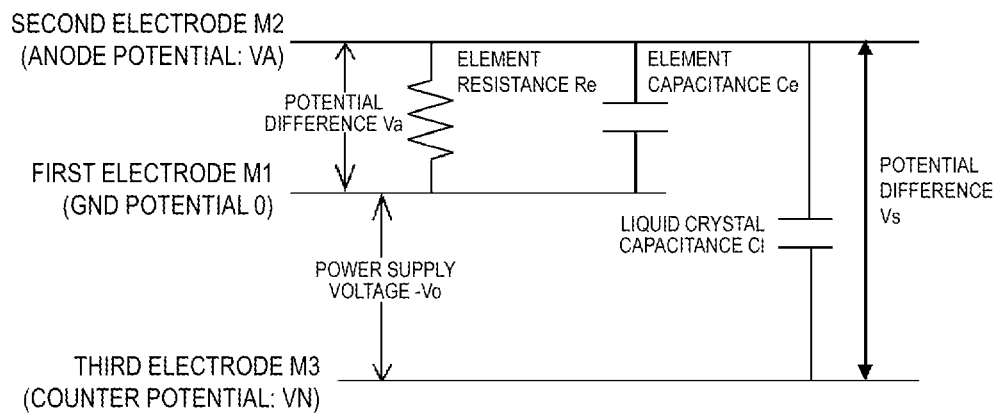
(b)
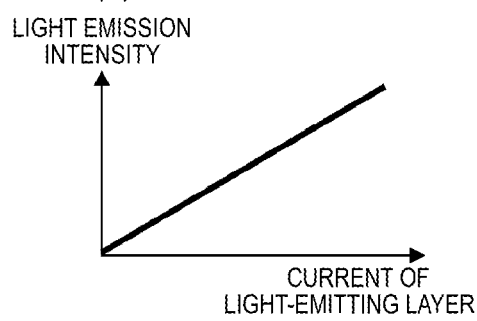
(c)
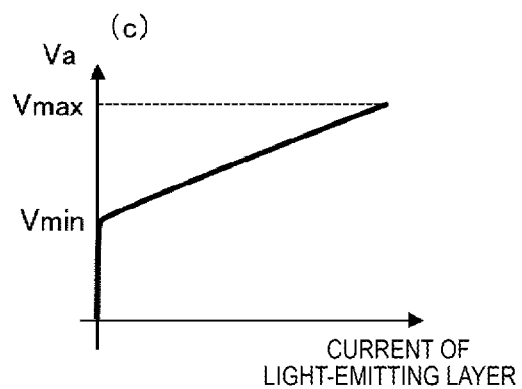
(d)
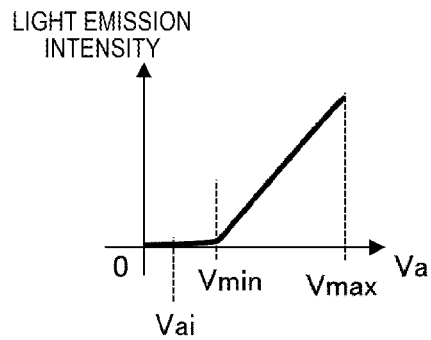
(e)
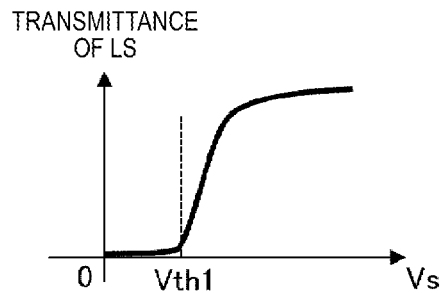
FIG. 2

(a)
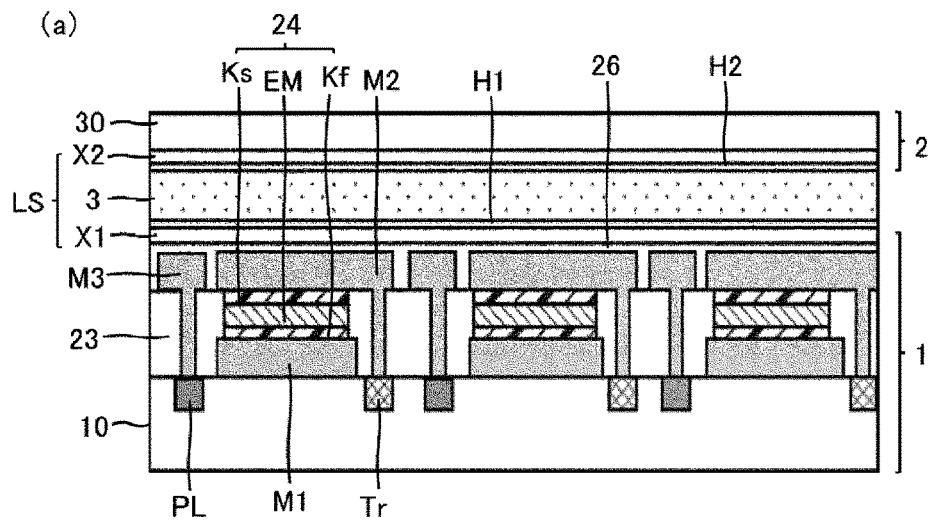
(b)
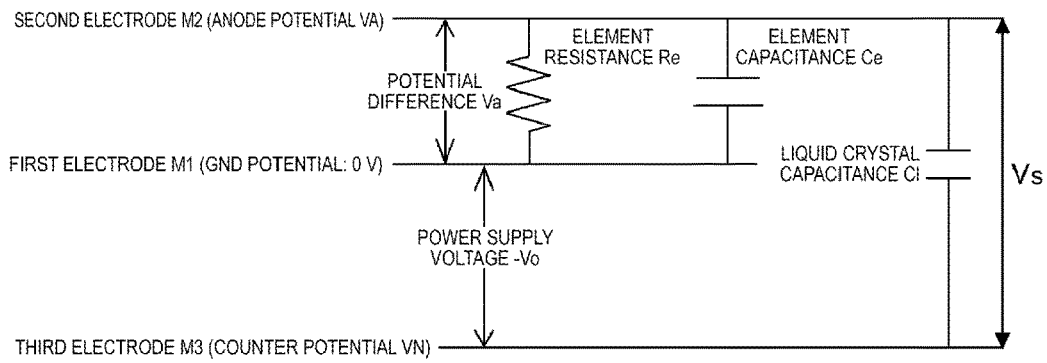
(c)
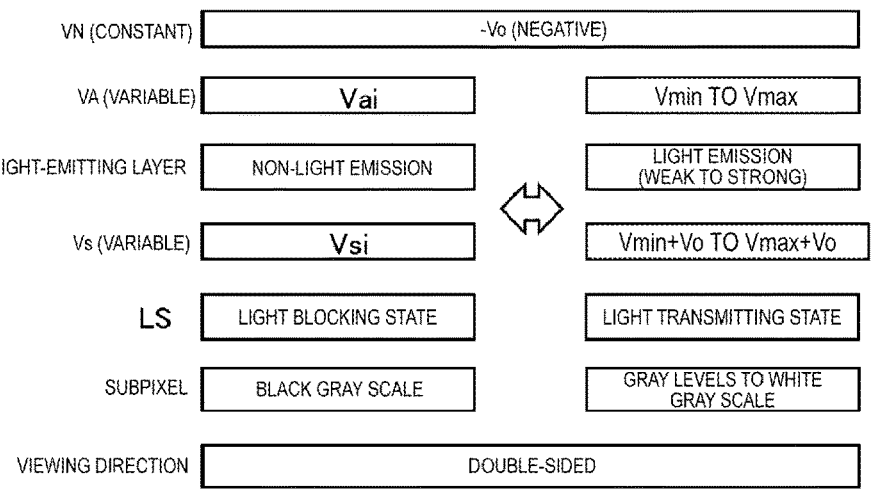
FIG. 8

(a)
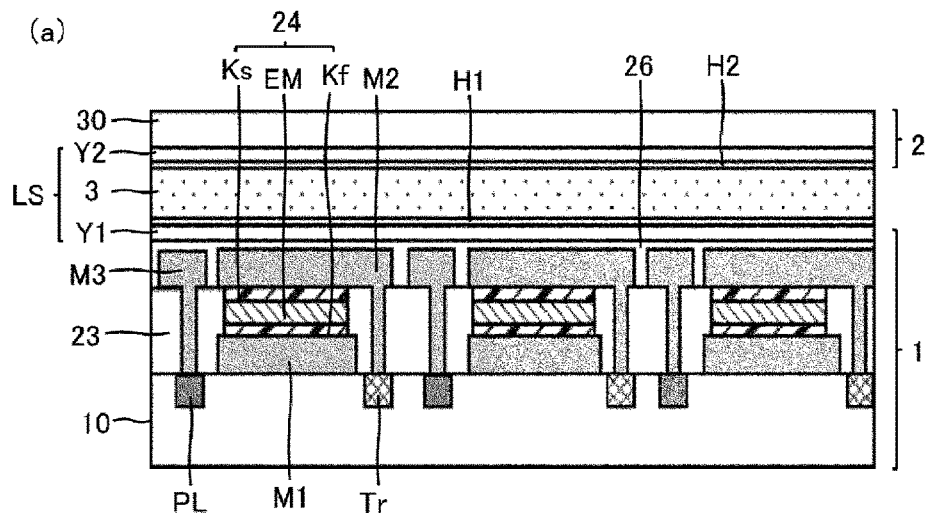
(b)
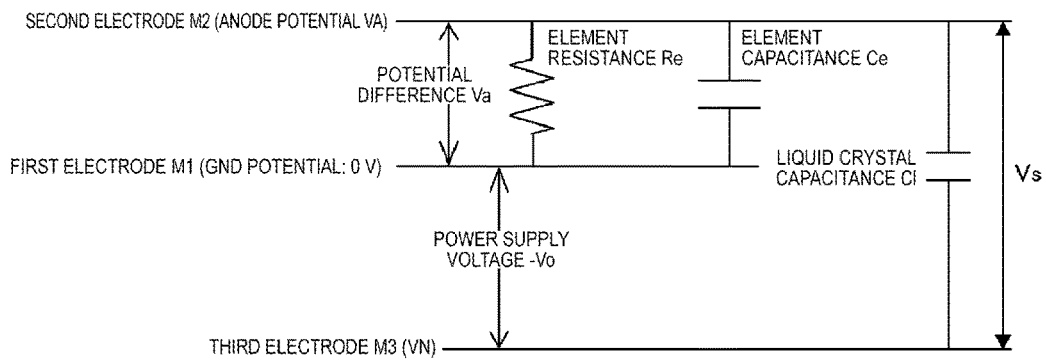
(c)
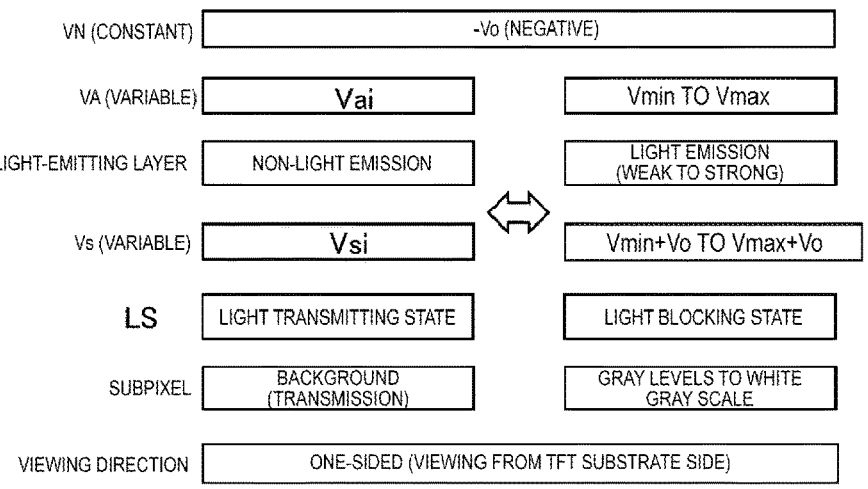
FIG. 13

(a)
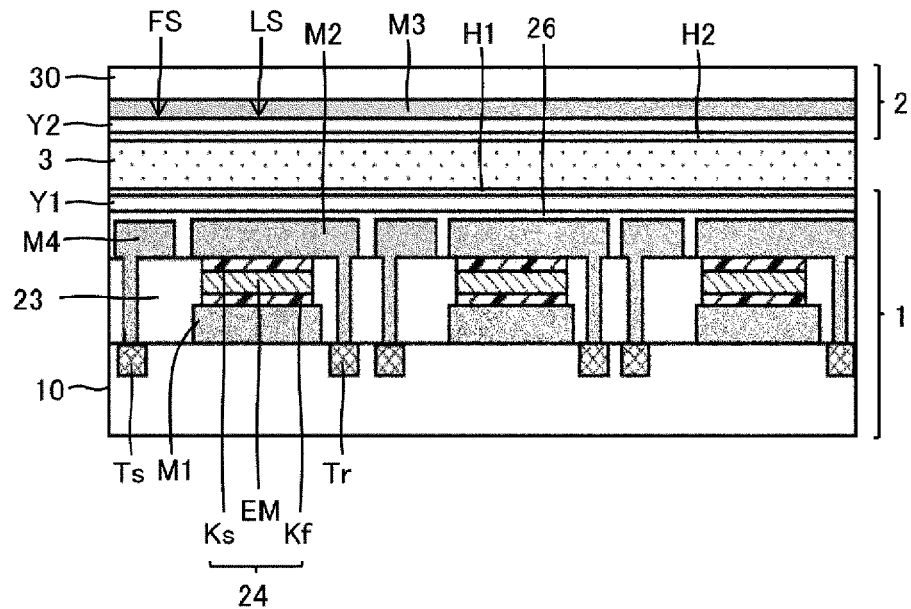
(b)
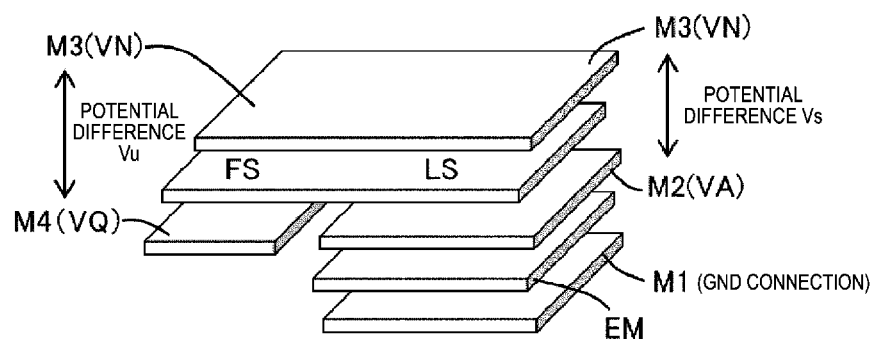
FIG. 14

(a)

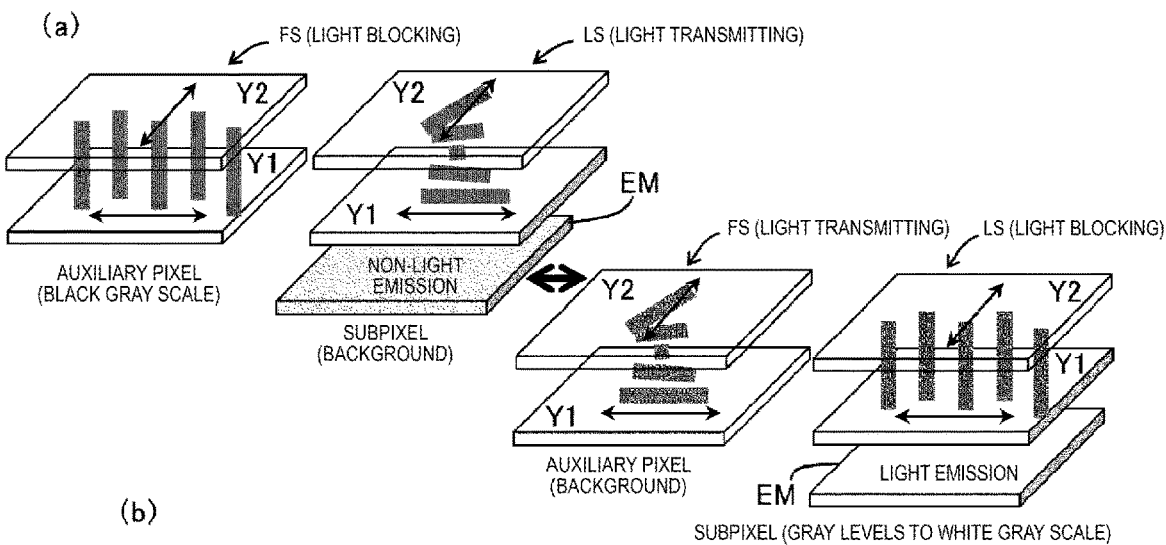

(b)

| VN (CONSTANT) | -Vo (NEGATIVE) | |
|---|---|---|
| VA (VARIABLE) | Vai | Vmin TO Vmax |
| LIGHT-EMITTING LAYER | NON-LIGHT EMISSION | LIGHT EMISSION |
| Vs (VARIABLE) | Vsi | Vmin+Vo TO Vmax+Vo |
| LS | LIGHT TRANSMITTING STATE | LIGHT BLOCKING STATE |
| SUBPIXEL | BACKGROUND (TRANSMISSION) | GRAY LEVELS TO WHITE GRAY SCALE |
| VQ (VARIABLE) | HIGH (Vmin OR HIGHER) | LOW (Vqi) |
| Vu (VARIABLE) | LARGE (Vmin + Vo OR GREATER) | SMALL |
| FS | LIGHT BLOCKING STATE | LIGHT TRANSMITTING STATE |
| AUXILIARY PIXEL | BLACK GRAY SCALE | BACKGROUND (TRANSMISSION) |
| VIEWING DIRECTION | ONE-SIDED (VIEWING FROM TFT SUBSTRATE SIDE) | |

(c) (d)

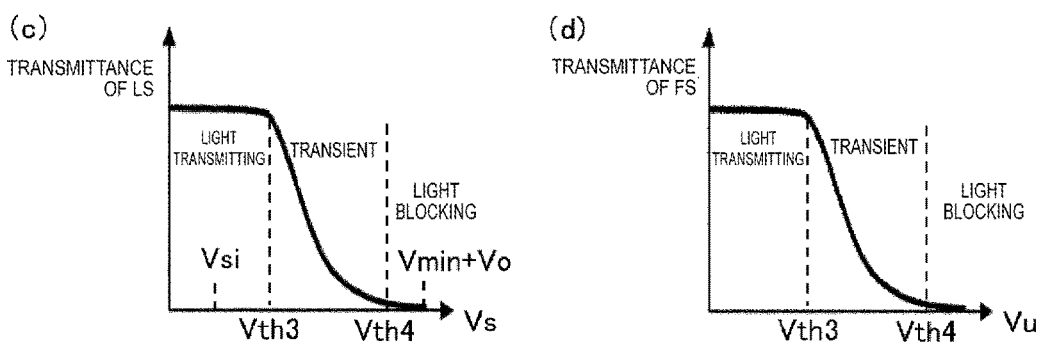

FIG. 15

DISPLAY DEVICE

TECHNICAL FIELD

The disclosure relates to a display device.

BACKGROUND ART

PTL 1 discloses a display device in which the display device itself has a light transmitting property and a background can be seen through a screen (so-called transparent display).

CITATION LIST

Patent Literature

PTL 1: JP 2013-156635 A

SUMMARY

Technical Problem

Such a display device has a problem in that it is difficult to achieve high contrast in an environment in which light is incident from a back face.

Solution to Problem

A display device according to an aspect of the disclosure includes a first electrode and a second electrode overlapping each other in a plan view, a light-emitting layer placed between the first electrode and the second electrode, a third electrode capable of forming an electrical field between the second electrode and the third electrode, and an optical adjustment element overlapping the light-emitting layer in a plan view and having light transmittance that changes in accordance with a potential difference between the second electrode and the third electrode.

Advantageous Effects of Disclosure

According to the aspect of the disclosure, contrast can be enhanced because the optical adjustment element controls light from a back face.

BRIEF DESCRIPTION OF DRAWINGS

FIG. 2(a) is an explanatory diagram illustrating potentials of first to third electrodes, FIG. 2(b) is a graph showing a characteristic of current of a light-emitting layer and light emission intensity, FIG. 2(c) is a graph showing a characteristic of the current of the light-emitting layer and voltage, FIG. 2(d) is a graph showing a characteristic of the voltage of the light-emitting layer and the light emission intensity, and FIG. 2(e) is a graph showing a characteristic of voltage of an optical adjustment element and transmittance.

FIG. 8(a) is a cross-sectional view illustrating a further modified example of the display device according to the first embodiment, FIG. 8(b) is an explanatory diagram illustrating the potentials of the first to third electrodes, and FIG. 8(c) is an explanatory diagram illustrating the operation of the display device.

FIG. 13(a) is a cross-sectional view illustrating a further modified example of the display device according to the second embodiment, FIG. 13(b) is an explanatory diagram illustrating potentials of the first to third electrodes, and FIG. 13(c) is an explanatory diagram illustrating operation of the display device.

FIG. 14(a) is a cross-sectional view illustrating a configuration of a display device according to a third embodiment, and FIG. 14(b) is an explanatory diagram illustrating potentials of first to third electrodes according to the third embodiment.

FIG. 15(a) is a schematic view illustrating operation of the display device, FIG. 15(b) is an explanatory diagram illustrating the operation of the display device, FIG. 15(c) is a graph showing a characteristic of voltage of an optical adjustment element and transmittance, and FIG. 15(d) is a graph showing voltage of an auxiliary element and the transmittance.

DESCRIPTION OF EMBODIMENTS

First Embodiment

Figure 1:
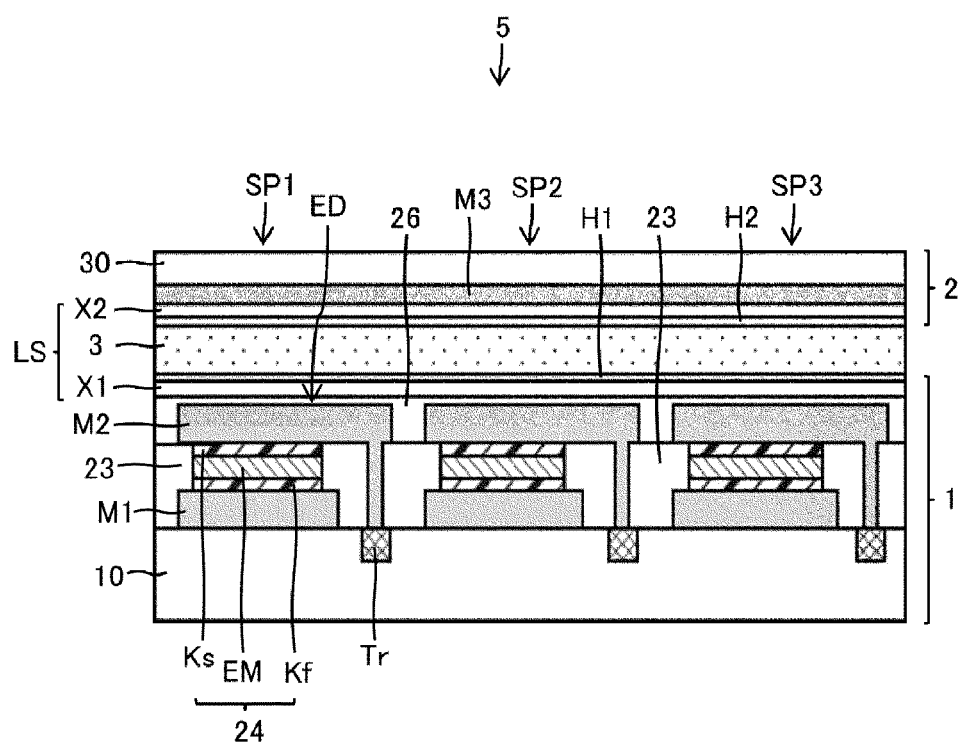
FIG. 1 is a cross-sectional view illustrating a configuration of a display device according to a first embodiment.

FIG. 1 is a cross-sectional view illustrating a configuration of a display device according to a first embodiment. As illustrated in FIG. 1, a display device 5 includes a first member 1, a second member 2 facing the first member 1, and a liquid crystal layer 3 placed between the first member 1 and the second member 2. In the first member 1, first electrodes M1, an edge cover film 23, electroluminescent (EL) layers 24, second electrodes M2, a sealing layer 26, a first polarizer X1, and a first alignment film H1 are provided in this order on a TFT substrate 10 including multiple thin film transistors Tr. In the second member 2, a third electrode M3, a second polarizer X2, and a second alignment film H2 are provided in this order on a counter substrate 30. The TFT substrate 10, the first electrode M1, the second electrode M2, the sealing layer 26, the third electrode M3, and the counter substrate 30 have a light transmitting property.

Hereinafter, a direction from the TFT substrate 10 to the counter substrate 30 is described as "upward direction", and a direction from the counter substrate 30 to the TFT substrate 10 is described as "downward direction" in FIG. 1. In other words, "lower layer" means a layer that is formed in a process prior to that of a comparison layer, and "upper layer" means a layer that is formed in a process after that of a comparison layer.

The TFT substrate 10 is obtained, for example, by forming an undercoat layer and a thin film transistor layer (TFT layer) on a base material made of glass, resin, or the like. The edge cover film 23 is an insulating film that covers edges of the first electrodes M1. The sealing layer 26 is a layer that prevents penetration of foreign matters such as water and oxygen. The first polarizer X1 may be a polarizing film formed on the sealing layer 26, or may be a polarizer bonded on the sealing layer 26. The same applies to the second polarizer X2.

The first member 1 and the second member 2 are disposed to face each other such that the first alignment film H1 and the second alignment film H2 are in contact with the liquid crystal layer 3, and the first polarizer X1, the first alignment film H1, the liquid crystal layer 3, the second alignment film H2, and the second polarizer X2 form an optical adjustment element LS (liquid crystal cell).

The EL layer 24 of the first member 1 includes a first charge transport layer Kf, a light-emitting layer EM, and a second charge transport layer Ks. The first electrode M1, the EL layer 24, and the second electrode M2 constitute a light-emitting element ED. The first charge transport layer Kf and the second charge transport layer Ks have a light transmitting property. The light-emitting element ED is provided on a subpixel-by-subpixel basis, and may be, for example, an organic light-emitting diode (OLED) including an organic layer as the light-emitting layer EM, or a quantum dot light emitting diode (QLED) including a quantum dot layer as the light-emitting layer EM. The third electrode M3 is a counter electrode common to the multiple light-emitting elements ED.

The display device 5 includes a first subpixel SP1 that emits red light, a second subpixel SP2 that emits green light, and a third subpixel SP3 that emits blue light. Each of the first subpixel SP1, the second subpixel SP2, and the third subpixel SP3 includes the first electrode M1, the second electrode M2, the light-emitting layer EM, and the optical adjustment element LS. The third electrode M3 is common to the first subpixel SP1, the second subpixel SP2, and the third subpixel SP3.

The first electrode M1 and the second electrode M2 are connected to a pixel circuit (described later) of the TFT substrate 10 and overlap each other in a plan view. The second electrode M2 is connected to the transistor Tr of the TFT substrate 10. The light-emitting layer EM is placed between the first electrode M1 and the second electrode M2. The third electrode M3 faces the second electrode M2 with the liquid crystal layer 3 interposed therebetween, and can form an electrical field between the second electrode M2 and the third electrode M3. The optical adjustment element LS placed between the second electrode M2 and the third electrode M3 overlaps the light-emitting layer EM in a plan view. Light transmittance of the optical adjustment element LS changes according to a potential difference between the second electrode M2 and the third electrode M3 (=a potential of the second electrode−a potential of the third electrode). The optical adjustment element LS is in one of multiple optical states (e.g., a light blocking state, a light transmitting state, and a transient state) in accordance with this potential difference. Note that "multiple members overlap in a plan view" refers to a state in which at least part of one member and at least part of another member overlap when the multiple members are viewed in, for example, the normal direction of a display surface.

FIG. 2(a) is an explanatory diagram illustrating potentials of the first to third electrodes, FIG. 2(b) is a graph showing a characteristic of current of the light-emitting layer and light emission intensity, FIG. 2(c) is a graph showing a characteristic of the current of the light-emitting layer and voltage, FIG. 2(d) is a graph showing a characteristic of the voltage of the light-emitting layer and the light emission intensity, and FIG. 2(e) is a graph showing a characteristic of voltage of the optical adjustment element and transmittance.

In the first embodiment, as illustrated in FIG. 2, the potential of the first electrode M1 (cathode) connected to the ground is GND potential 0, a potential VA of the second electrode M2 (anode) is an anode potential, and a potential VN of the third electrode M3 (counter electrode) is a counter potential. Although a power supply voltage −Vo is applied so that the third electrode M3 is negative with respect to the first electrode M1 in FIG. 2, the power supply voltage is not limited to being negative. The potential VA of the second electrode M2 may be a negative potential by applying a positive power supply voltage to the third electrode M3.

An element resistance Re and an element capacitance Ce are formed between the first electrode M1 and the second electrode M2. A liquid crystal capacitance Cl is formed between the second electrode M2 and the third electrode M3.

In the light-emitting element ED, when current generated in the light-emitting layer EM (current at the element resistance Re) increases, the light emission intensity of the light-emitting layer EM increases, and the potential difference Va between the second electrode M2 and the first electrode M1 also increases. Due to the element capacitance Ce, no current is generated in the light-emitting layer EM when the potential difference Va is less than Vmin (positive voltage) in FIG. 2, and current is generated in the light-emitting layer EM (the light-emitting layer EM emits light) when the potential difference Va is Vmin or greater in FIG. 2. When the potential difference Va is Vmax, the light emission intensity of the light-emitting layer EM is maximum (luminance corresponding to the maximum gray scale of the subpixel). A potential difference Vs (=VA−VN) between the second electrode M2 and the third electrode M3 is a voltage applied to the liquid crystal capacitance Cl (including the optical adjustment element LS). Since the potential of the first electrode M1 is 0, the potential VN is a value of the power supply voltage −Vo itself, and the potential VA is a value of the potential difference Va itself. The potential difference Va when no current is injected (no voltage is applied) to the second electrode M2 is a divided voltage value Vai determined by Equation 1 below based on a capacitance ratio between the element capacitance Ce and the liquid crystal capacitance Cl.

$$Vai=-Vo \times Ce/(Ce+Cl) \qquad \text{[Equation 1]}$$

FIG. 3(a) is a schematic view illustrating a layered structure of the light-emitting layer and the first to third electrodes of the first embodiment, FIG. 3(b) is a schematic view illustrating states of the optical adjustment element and the light-emitting layer, FIG. 3(c) is an explanatory diagram illustrating operation of the display device, and FIGS. 3(d) and 3(e) are graphs showing a characteristic of the voltage of the optical adjustment element and the transmittance. FIG. 4 is a schematic view illustrating an effect of the first embodiment.

Figure 3:
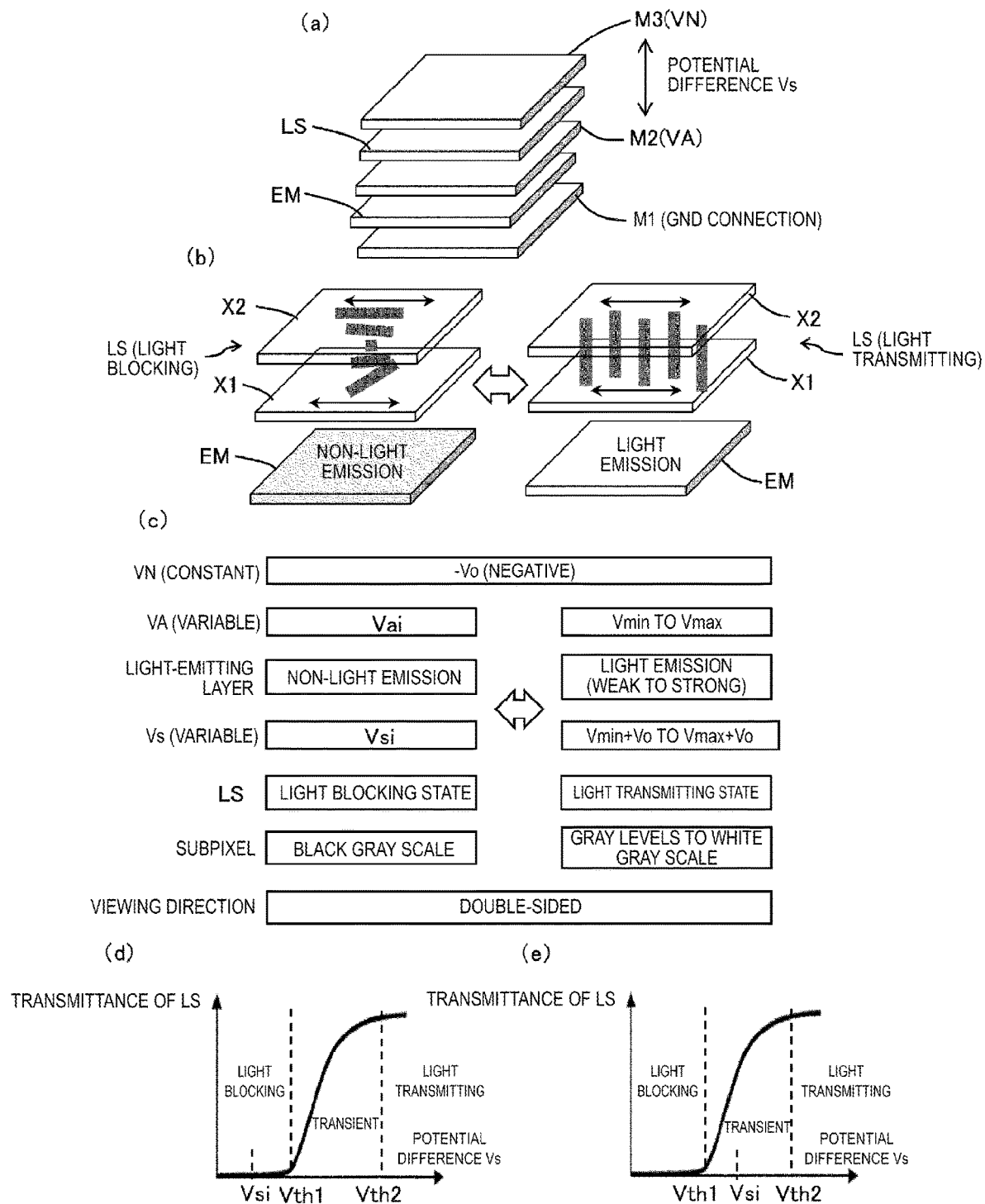
FIG. 3(a) is a schematic view illustrating a layered structure of the light-emitting layer and the first to third electrodes of the first embodiment.
FIG. 3(b) is a schematic view illustrating states of the optical adjustment element and the light-emitting layer.
FIG. 3(c) is an explanatory diagram illustrating operation of the display device.
FIGS. 3(d) and 3(e) are graphs showing a characteristic of the voltage of the optical adjustment element and the transmittance.
Figure 4:
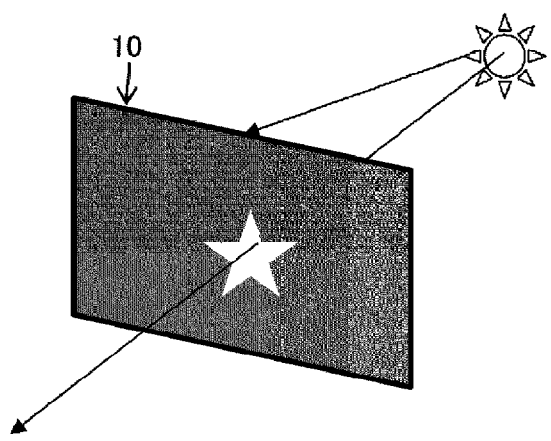
FIG. 4 is a schematic view illustrating an effect of the first embodiment.

As illustrated in FIG. 3, in the optical adjustment element LS, a polarization axis of the first polarizer X1 and a polarization axis of the second polarizer X2 are parallel. The optical adjustment element LS is in the light blocking state when the potential VA of the second electrode M2 is low (the potential difference Vs is small), and the optical adjustment element LS is in the light transmitting state when the potential VA of the second electrode M2 is high (the potential difference Vs is large).

Optical states of the optical adjustment element LS in which the polarization axes of the first polarizer X1 and the second polarizer X2 are parallel include the light blocking state in which liquid crystal molecules are substantially lying down, the light transmitting state in which the liquid crystal molecules are substantially standing, and the transient state from the light blocking state to the light transmitting state. The optical adjustment element LS is in the light blocking state when the liquid crystal layer 3 rotates the polarization direction of light (preferably by 90 degrees). For the potential difference Vs, a threshold value when a state changes from the light blocking state (a state in which the liquid crystal molecules are substantially lying down) to the transient state (a state in which some of the liquid crystal molecules are standing) is a first voltage Vth1, and a threshold value when a state changes from the transient state to the light transmitting state (a state in which the liquid crystal molecules are substantially standing) is a second voltage Vth2. Here, Vth1<Vth2. FIG. 3 illustrates a case in which the liquid crystal layer of the optical adjustment element LS is of a TN system, but the same applies to a vertical alignment (VA) system.

As shown in FIG. 3(d), by setting a value Vsi (=Vo×Cl/(Ce+Cl)) of the potential difference Vs when no current is injected into the second electrode M2 to be less than the first voltage Vth1, and by making the potential difference Vs (=Vmin+Vo) greater than the first voltage Vth1 when current is injected into the second electrode M2 and the potential VA is Vmin, when no current is injected into the second electrode M2, the optical adjustment element LS is in the light blocking state, and when the current is injected into the second electrode M2 and the potential VA is Vmin or higher, the optical adjustment element LS is in the transient state or the light transmitting state. As an example, Vo=0.1 [V], Vth1=1.0 [V], Vmin=2.0 [V], and Vmax=5.0 [V] are assumed. Usually, the light-emitting layer EM has a relative dielectric constant εe of about 8.0 and a film thickness De of about 50 nm, and the optical adjustment element LS has a relative dielectric constant εl of about 6.0 and a film thickness Dl of about 50 μm. The element capacitance Ce and the liquid crystal capacitance Cl are calculated using Equation 2 and Equation 3 below.

$$Ce=\varepsilon 0 \times \varepsilon e \times S/De \qquad \text{[Equation 2]}$$

$$Cl=\varepsilon 0 \times \varepsilon l \times S/Dl \qquad \text{[Equation 3]}$$

where ε0 is a dielectric constant of vacuum and S is an electrode area. From Equations 1, 2, and 3, when no current is injected into the second electrode M2, Vai is −0.099 V and Vsi is 0.001 V, which is smaller than Vth1. When the current is injected into the second electrode M2 and Va is Vmin, Vs is 2.1 V, which is larger than Vth1.

In this way, during a non-light emission period in which the light-emitting layer EM is in a non-light emission state, the optical adjustment element LS is in the light blocking state and the subpixel is displayed in black gray scale, and during a light emission period in which the light-emitting layer EM is in a light emission state, the optical adjustment element LS is in the light transmitting state and the subpixel is displayed in gray levels to white gray scale. In the first embodiment, a viewing direction is double-sided, so that viewing from a TFT substrate 10 side and viewing from a counter substrate 30 side are possible.

When the light-emitting layer EM has low luminance and the transmittance of the optical adjustment element LS is desired to be high, Vmin+Vo is set to be greater than Vth2. When the light-emitting layer EM has low luminance and the transmittance of the optical adjustment element LS is desired to be low, Vmin+Vo is set to be less than Vth2.

According to the first embodiment, when the light-emitting layer EM is in the light emission state (light emission period), the optical adjustment element LS is autonomously in the transient state or the light transmitting state, and when the light-emitting layer EM is in the non-light emission state, the optical adjustment element LS is autonomously in the light blocking state (blocks back light). Thus, high-contrast double-sided display capable of black gray scale display can be achieved as illustrated in FIG. 4.

In FIG. 3(d), Vsi is less than Vth1, but Vsi does not have to be less than Vth1. As shown in FIG. 3(e), Vsi can be greater than Vth1 and less than Vth2. This provides a transparent display in which the optical adjustment element LS is in the transient state (a background is visible) when the light-emitting layer EM is in the non-light emission state. In addition, the transmittance of LS can be increased when the light-emitting layer EM is at low luminance, thus enabling a reduction in power consumption.

Figure 5:
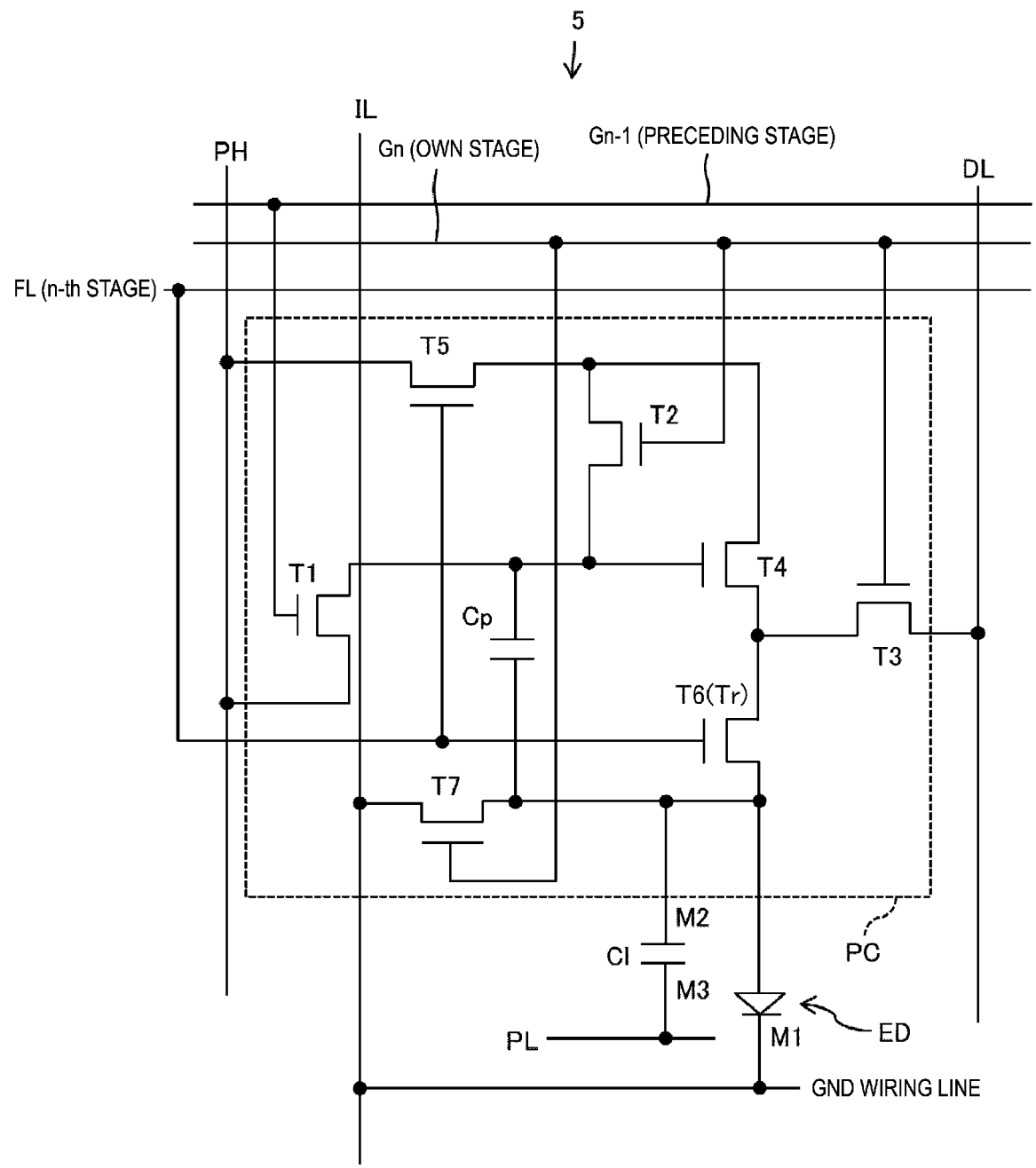
FIG. 5 is a circuit diagram illustrating an example of a connection relationship between a pixel circuit of a TFT substrate and the first to third electrodes.

FIG. 5 is a circuit diagram illustrating an example of a connection relationship between the pixel circuit of the TFT substrate and the first to third electrodes. The pixel circuit PC in FIG. 5 includes a capacitance element Cp, a reset transistor T1 including a gate terminal connected to a scanning signal line Gn-1 for a preceding stage, a threshold control transistor T2 including a gate terminal connected to a scanning signal line Gn for a stage of the pixel circuit PC itself, a writing control transistor T3 including a gate terminal connected to the scanning signal line Gn for the stage of the pixel circuit PC itself, a drive transistor T4 that controls the current of the light-emitting element ED, a power supply transistor T5 including a gate terminal connected to a light emission control line FL, a light emission control transistor T6 including a gate terminal connected to the light emission control line FL, and an initialization transistor T7 including a gate terminal connected to the scanning signal line Gn for a stage of the pixel circuit PC itself.

The gate terminal of the drive transistor T4 is connected to an anode (the second electrode M2) of the light-emitting element ED via the capacitance element Cp, and is connected to a power source line PH via the reset transistor T1. A high potential side power supply is supplied to the power source line PH.

A source terminal of the drive transistor T4 is connected to a data signal line DL via the writing control transistor T3, and is connected to the anode of the light-emitting element ED via the light emission control transistor T6 (transistor Tr in FIG. 1). A drain terminal of the drive transistor T4 is connected to the gate terminal of the drive transistor T4 via the threshold control transistor T2, and is connected to the power source line PH via the power supply transistor T5.

The anode of the light-emitting element ED is connected to an initialization signal line IL via the initialization transistor T7. The initialization signal line IL and a cathode of the light-emitting element ED (the first electrode M1) is connected to a ground wiring line (GND wiring line). The third electrode M3 of the second member 2 is connected to a power source line PL that supplies the negative power supply voltage −Vo.

Figure 6:
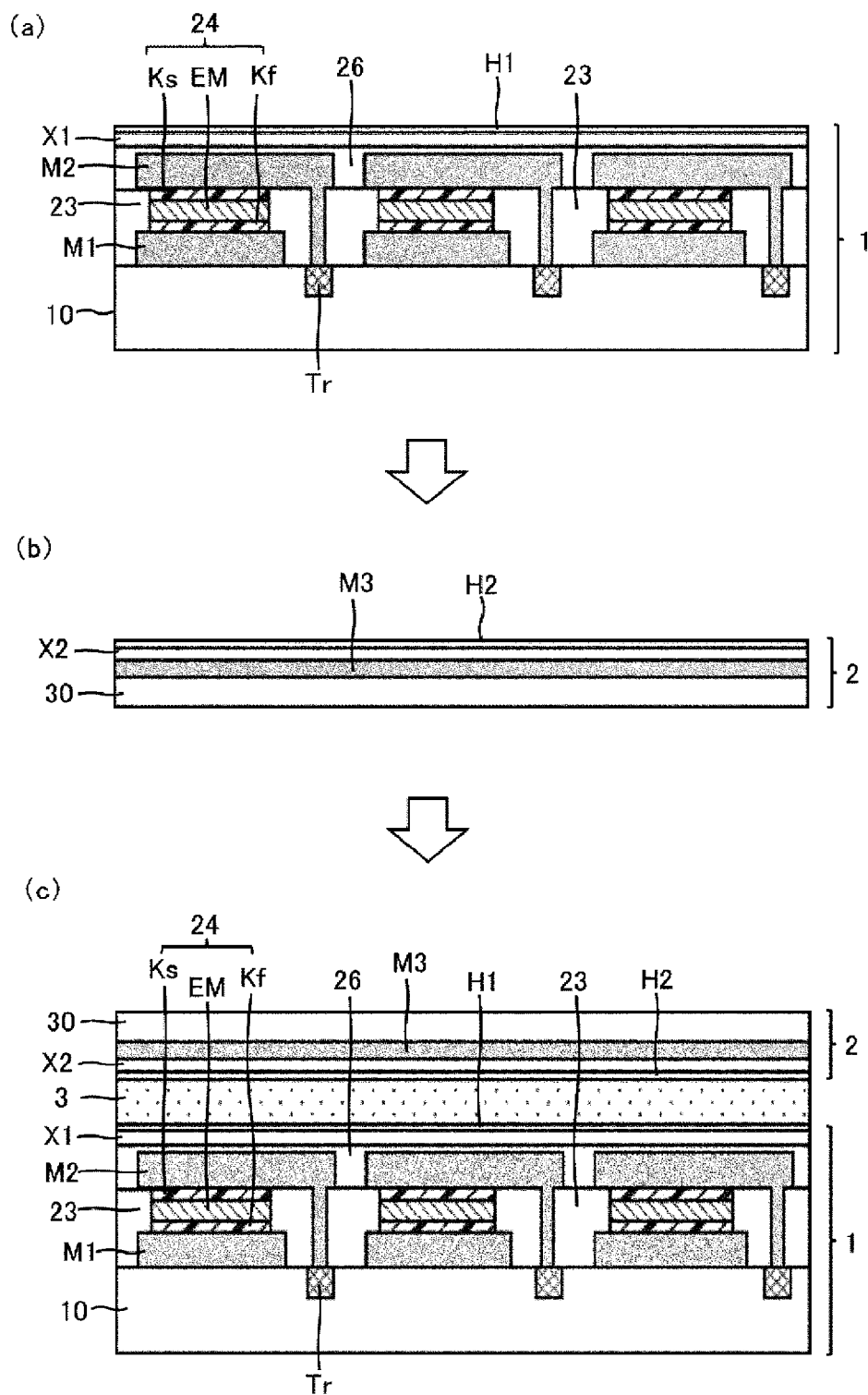
FIGS. 6(a) to 6(c) are cross-sectional views illustrating a manufacturing method of the display device according to the first embodiment.

FIGS. 6(a) to 6(c) are cross-sectional views illustrating a manufacturing method of the display device according to the first embodiment. In FIG. 6(a), the first electrodes M1, the edge cover film 23, the electroluminescent (EL) layers 24, the second electrodes M2, the sealing layer 26, the first polarizer X1, and the first alignment film H1 are formed in this order on the TFT substrate 10 to form the first member 1. In FIG. 6(b), the third electrode M3, the second polarizer X2, and the second alignment film H2 are formed in this order on the counter substrate 30 to form the second member 2. In FIG. 6(c), the first member 1 and the second member 2 are bonded so that the first alignment film H1 and the second alignment film H2 face each other with a space therebetween, and the liquid crystal layer 3 is sealed in this space.

Here, the first polarizer X1 and the second polarizer X2 may be formed by applying materials that form polarization patterns. In this configuration, light emitted from the liquid crystal layer 3 can pass through the polarizer without being disturbed in the polarization direction due to scattering or the like. This enables a highly pure black display and is also suitable for flexibility. In addition, light emitted to the TFT substrate side (downward) does not pass through the polarizer (is not weakened by the polarizer), which reduces power consumption and improves viewability from the TFT substrate side.

Although the optical adjustment element LS is provided in common across multiple subpixels in the first embodiment, the optical adjustment element LS may be provided individually for each cell. In this configuration, up to the second electrodes M2 are formed in FIG. 6(a), up to the second electrodes M2, which operate the optical adjustment elements LS (liquid crystal cells), are formed in FIG. 6(b), and then the second electrodes M2 are bonded to each other.

Figure 7:
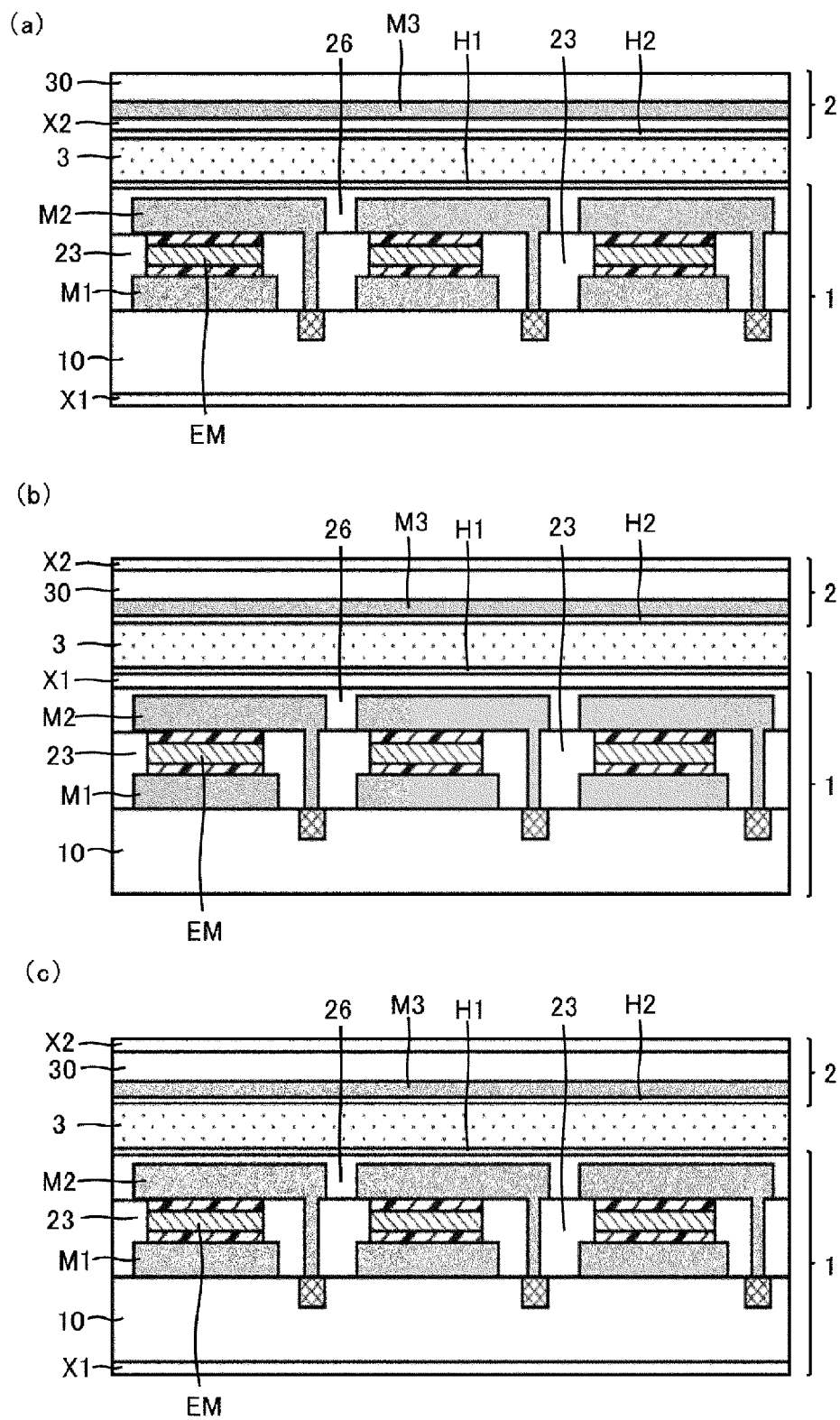
FIGS. 7(a) to 7(c) are cross-sectional views illustrating modified examples of the display device according to the first embodiment.

FIGS. 7(a) to 7(c) are cross-sectional views illustrating modified examples of the display device according to the first embodiment. In FIG. 1, the first polarizer X1 is placed between the TFT substrate 10 and the liquid crystal layer 3 (inside of the TFT substrate 10), but a position of the first polarizer X1 is not limited thereto. As illustrated in FIG. 7(a), the first polarizer X1 may be placed outside the TFT substrate 10 (under the TFT substrate 10). In this configuration, intensity of light from the light-emitting layer EM is halved when the light passes through the first polarizer X1 and exits downward and when the light passes through the second polarizer X2 and exits upward. Thus, equivalent display is possible on both sides. In addition, a polarizer that can be bonded to the TFT substrate 10 can be used as the first polarizer X1, which facilitates manufacturing. In FIG. 1, the second polarizer X2 is placed between the counter substrate 30 and the liquid crystal layer 3 (inside of the counter substrate 30), but a position of the second polarizer X2 is not limited thereto. As illustrated in FIG. 7(b), the second polarizer X2 may be placed outside the counter substrate 30 (above the third electrode M3). In this configuration, a polarizer that can be bonded to the counter substrate 30 can be used as the second polarizer X2, which facilitates manufacturing. In addition, light emitted to the TFT substrate side (downward) does not pass through the polarizer (is not weakened by the polarizer), which reduces power consumption and improves viewability from the TFT substrate side. As illustrated in FIG. 7(c), the first polarizer X1 may be placed outside the TFT substrate 10 (under the TFT substrate 10), and the second polarizer X2 may be placed outside the counter substrate 30 (above the third electrode M3). In this configuration, intensity of light from the light-emitting layer EM is halved when the light passes through the first polarizer X1 and exits downward and when the light passes through the second polarizer X2 and exits upward. Thus, equivalent display is possible on both sides. A polarizer that can be bonded to the TFT substrate 10 can be used as the first polarizer X1 and a polarizer that can be bonded to the counter substrate 30 can be used as the second polarizer X2, which facilitates manufacturing.

FIG. 8(a) is a cross-sectional view illustrating a further modified example of the display device according to the first embodiment, FIG. 8(b) is an explanatory diagram illustrating the potentials of the first to third electrodes, and FIG. 8(c) is an explanatory diagram illustrating the operation of the display device. In FIG. 1, the second electrode M2 and the third electrode M3 are arranged in the layering direction (normal direction to the substrate), and a vertical electrical field is generated between the second electrode M2 and the third electrode M3, but the electrical field generated between the second electrode M2 and the third electrode M3 is not limited to the vertical electrical field. As illustrated in FIG. 8(a), by using liquid crystals that adopt a transverse electrical field control mode for the liquid crystal layer 3 and arranging the second electrode M2 and the third electrode M3 adjacent to each other in a planar direction (direction parallel to the substrate), a transverse electrical field may be generated between the second electrode M2 and the third electrode M3. The third electrode M3 is connected to the power source line PL that supplies the negative power supply voltage (−Vo). Alternatively, the third electrode M3 may be formed in a comb-teeth shape so as to straddle the subpixels, and a common power supply voltage (−Vo) may be applied to the third electrode M3.

FIGS. 8(b) and 8(c) are similar to FIGS. 2(a) and 3(c). When the light-emitting layer EM is in the non-light emission state, the optical adjustment element LS is in the light blocking state, and the subpixel is displayed in black gray scale. On the other hand, when the light-emitting layer EM is in the light emission state, the optical adjustment element LS is in the transient state or the light transmitting state, and the subpixel is displayed in gray levels to white gray scale. The viewing direction is double-sided, so that the viewing from the TFT substrate 10 side and the viewing from the counter substrate 30 side are possible. It is also possible to configure a transparent display in which the optical adjustment element LS is in the transient state when the light-emitting layer EM is in the non-light emission state.

Second Embodiment

Figure 9:
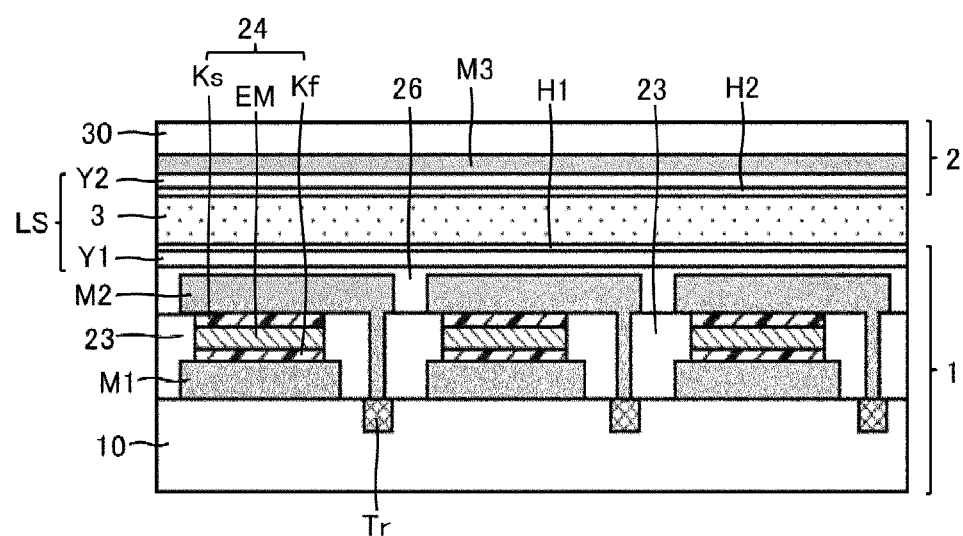
FIG. 9 is a cross-sectional view illustrating a configuration of a display device according to a second embodiment.

FIG. 9 is a cross-sectional view illustrating a configuration of a display device according to a second embodiment. As illustrated in FIG. 9, a display device 5 includes a first member 1, a second member 2 facing the first member 1, and a liquid crystal layer 3 placed between the first member 1 and the second member 2. In the first member 1, first electrodes M1, an edge cover film 23, electroluminescent (EL) layers 24, second electrodes M2, a sealing layer 26, a first polarizer Y1, and a first alignment film H1 are provided in this order on a TFT substrate 10 including multiple thin film transistors Tr. In the second member 2, a third electrode M3, a second polarizer Y2, and a second alignment film H2 are provided in this order on a counter substrate 30. The TFT substrate 10, the first electrode M1, the second electrode M2, the sealing layer 26, the third electrode M3, and the counter substrate 30 have a light transmitting property.

The first member 1 and the second member 2 are disposed to face each other such that the first alignment film H1 and the second alignment film H2 are in contact with the liquid crystal layer 3, and the first polarizer Y1, the first alignment film H1, the liquid crystal layer 3, the second alignment film H2, and the second polarizer Y2 form an optical adjustment element LS.

FIG. 10(a) is a schematic view illustrating a layered structure of a light-emitting layer and the first to third electrodes of the second embodiment, FIG. 10(b) is a schematic view illustrating states of the optical adjustment element and the light-emitting layer, FIG. 10(c) is an explanatory diagram illustrating operation of the display device, and FIGS. 10(d) and 10(e) are graphs showing a characteristic of voltage of the optical adjustment element and transmittance. FIG. 11 is a schematic view illustrating an effect of the second embodiment.

Figure 10:
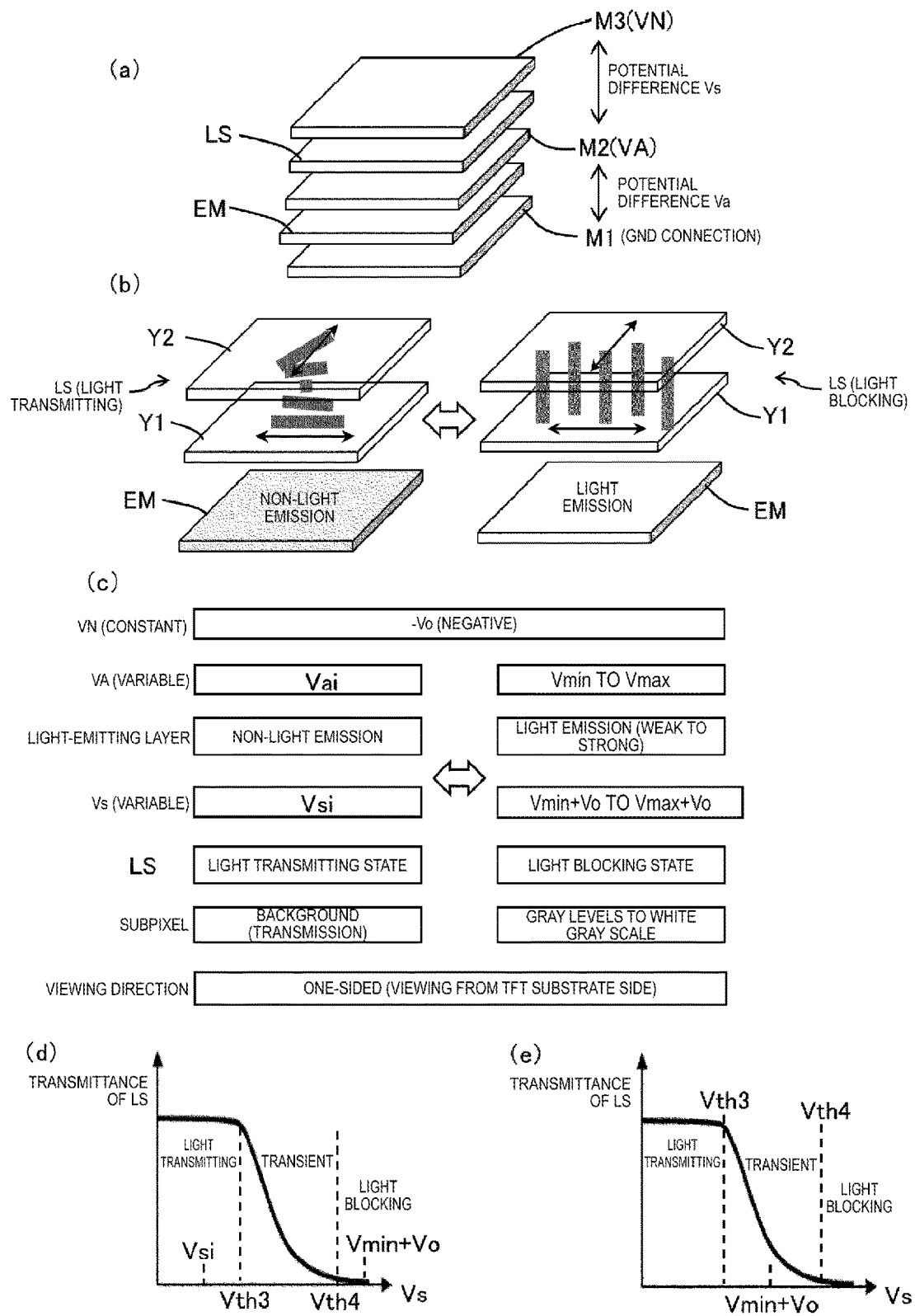
FIG. 10(a) is a schematic view illustrating a layered structure of a light-emitting layer and first to third electrodes of the second embodiment.
FIG. 10(b) is a schematic view illustrating states of an optical adjustment element and the light-emitting layer.
FIG. 10(c) is an explanatory diagram illustrating operation of the display device.
FIGS. 10(d) and 10(e) are graphs showing a characteristic of voltage of the optical adjustment element and transmittance.
Figure 11:
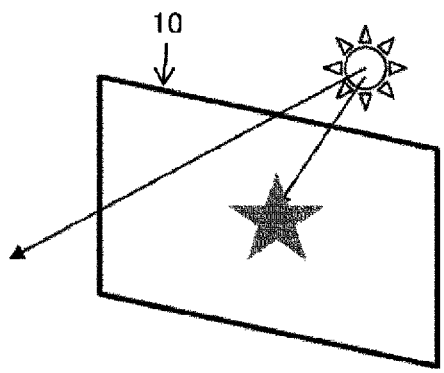
FIG. 11 is a schematic view illustrating an effect of the second embodiment.

As illustrated in FIG. 10, in the optical adjustment element LS, a polarization axis of the first polarizer Y1 and a polarization axis of the second polarizer Y2 are orthogonal. The optical adjustment element LS is in a light transmitting state when a potential difference Vs between the second electrode M2 and the third electrode M3 is small, and the optical adjustment element LS is in a light blocking state when the potential difference Vs between the second electrode M2 and the third electrode M3 is large.

Optical states of the optical adjustment element LS in which the polarization axes of Y1 and Y2 are orthogonal include the light transmitting state in which liquid crystal molecules are substantially lying down, the light blocking state in which the liquid crystal molecules are substantially standing, and a transient state from the light transmitting state to the light blocking state. The optical adjustment element LS is in the light blocking state when the liquid crystal layer 3 does not change the polarization direction of light. For the potential difference Vs, a threshold value from the light transmitting state to the transient state is a third voltage Vth3, and a threshold value from the transient state to the light blocking state is a fourth voltage Vth4. FIG. 10 illustrates a case in which the liquid crystal layer of the optical adjustment element LS is of a TN system, but the same applies to a VA system.

As shown in FIG. 10(d), by setting a value Vsi (=Vo×Cl/(Ce+Cl)) of the potential difference Vs when no current is injected into the second electrode M2 to be less than the fourth voltage Vth4, and by making the potential difference Vs (=Vmin+Vo) greater than the fourth voltage Vth4 when current is injected into the second electrode M2 and a potential VA is Vmin, when no current is injected into the second electrode M2, the optical adjustment element LS is in the light transmitting state, and when the current is injected into the second electrode M2 and the potential difference Va is Vmin or greater, the optical adjustment element LS is in the light blocking state.

In this way, when the light-emitting layer EM is in a non-light emission state, the optical adjustment element LS is in the light transmitting state and a background is visible through the subpixel (transparent display), and when the light-emitting layer EM is in a light emission state, the optical adjustment element LS is in the light blocking state and the subpixel is displayed in gray levels to white gray scale. In the second embodiment, a viewing direction is one-sided, and viewing from a TFT substrate 10 side is possible.

According to the second embodiment, when the light-emitting layer EM is in the non-light emission state, the optical adjustment element LS is autonomously in the transient state or the light transmitting state, and when the light-emitting layer EM is in the light emission state, the optical adjustment element LS is autonomously in the light blocking state (blocks back light). Thus, a high-contrast transparent display can be achieved by blocking external light (back light) incident on the light-emitting layer EM during light emission as illustrated in FIG. 11. This results in a transparent display with low power consumption.

When the light-emitting layer EM is in the non-light emission state and the transmittance of the optical adjustment element LS is desired to be high, Vsi is set to be equal to or less than Vth3. When the light-emitting layer EM is in the non-light emission state and the transmittance of the optical adjustment element LS is desired to be low, Vmin+Vo is set to be sufficiently greater than the fourth voltage Vth4 so that Vsi is greater than Vth3 and less than Vth4 (in this case, black display is substantially possible).

In FIG. 10(d), Vmin+Vo is greater than Vth4, but Vmin+Vo does not have to be greater than Vth4. As shown in FIG. 10(e), Vmin+Vo can be less than Vth4. This provides a transparent display in which the optical adjustment element LS is in the transient state (a background is visible) when the light-emitting layer EM is at low luminance. Further, when Vmax+Vo is less than Vth4, a transparent display is obtained in which the background is always visible when the light-emitting layer EM is in the light emission state.

Figure 12:
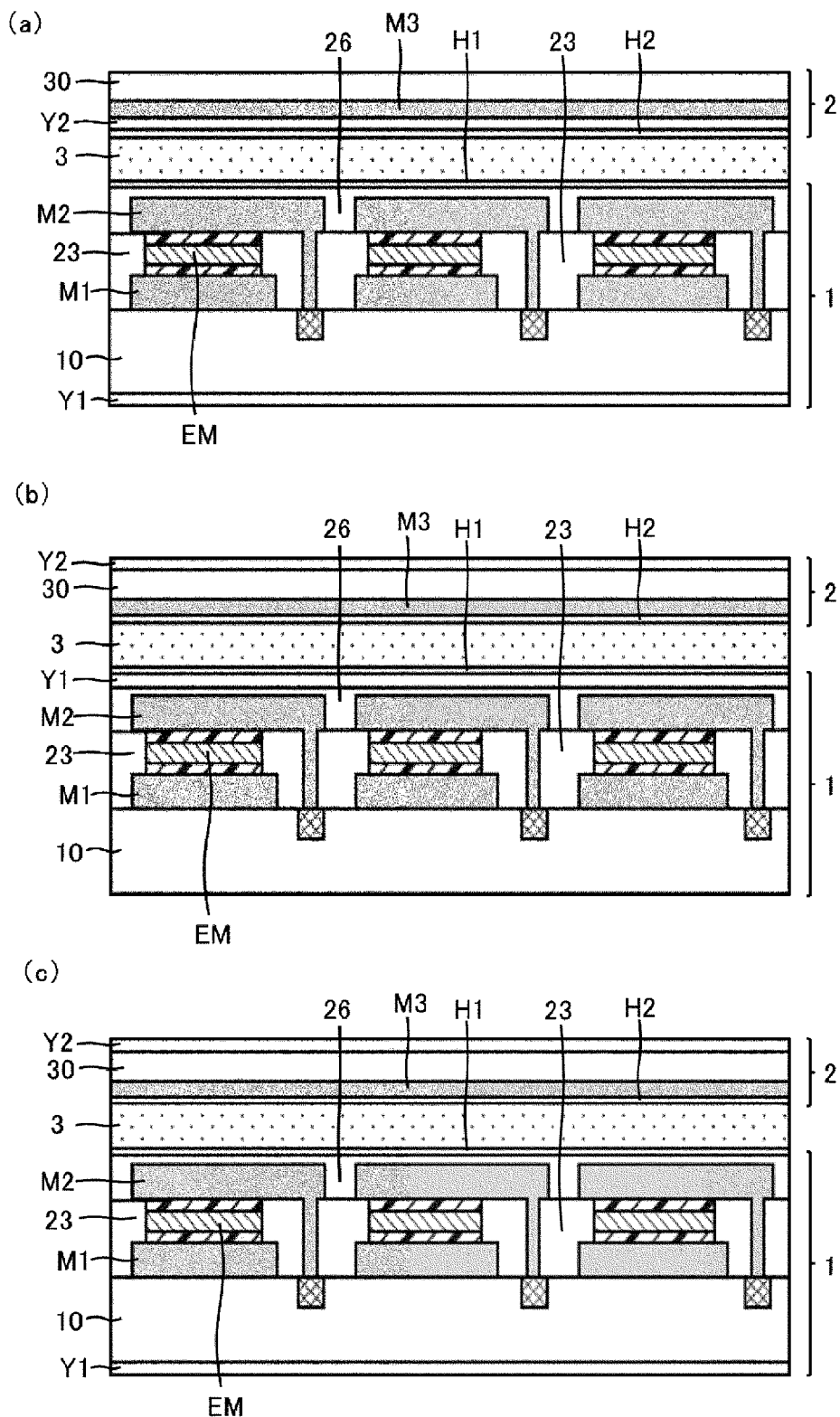
FIGS. 12(a) to 12(c) are cross-sectional views illustrating modified examples of the display device according to the second embodiment.

FIGS. 12(a) to 12(c) are cross-sectional views illustrating modified examples of the display device according to the second embodiment. In FIG. 9, the first polarizer Y1 is placed between the TFT substrate 10 and the liquid crystal layer 3 (inside of the TFT substrate 10), but a position of the first polarizer Y1 is not limited thereto. As illustrated in FIG. 12(a), the first polarizer Y1 may be placed outside the TFT substrate 10 (under the TFT substrate 10). In this configuration, a polarizer that can be bonded to the TFT substrate 10 can be used as the first polarizer Y1, which facilitates manufacturing. In FIG. 9, the second polarizer Y2 is placed between the counter substrate 30 and the liquid crystal layer 3 (inside of the counter substrate 30), but a position of the second polarizer Y2 is not limited thereto. As illustrated in FIG. 12(b), the second polarizer Y2 may be placed outside the counter substrate 30. In this configuration, a polarizer that can be bonded to the counter substrate 30 can be used as the second polarizer Y2, which facilitates manufacturing. In addition, light emitted to the TFT substrate side (downward) does not pass through the polarizer (is not weakened by the polarizer), which reduces power consumption and improves viewability from the TFT substrate side. As illustrated in FIG. 12(c), the first polarizer Y1 may be placed outside the TFT substrate 10 and the second polarizer Y2 may be placed outside the counter substrate 30. In this configuration, a polarizer that can be bonded to the TFT substrate 10 can be used as the first polarizer Y1 and a polarizer that can be bonded to the counter substrate 30 can be used as the second polarizer Y2, which facilitates manufacturing.

FIG. 13 (a) is a cross-sectional view illustrating a further modified example of the display device according to the second embodiment, FIG. 13 (b) is an explanatory diagram illustrating the potentials of the first to third electrodes, and FIG. 13 (c) is an explanatory diagram illustrating the operation of the display device. In FIG. 9, the second electrode M2 and the third electrode M3 are arranged in the layering direction (normal direction to the substrate), and a vertical electrical field is generated between the second electrode M2 and the third electrode M3, but the electrical field generated between the second electrode M2 and the third electrode M3 is not limited to the vertical electrical field. As illustrated in FIG. 13 (a), by using liquid crystals that adopt a transverse electrical field control mode for the liquid crystal layer 3 and arranging the second electrode M2 and the third electrode M3 adjacent to each other in a planar direction (direction parallel to the substrate), a transverse electrical field may be generated between the second electrode M2 and the third electrode M3. The third electrode M3 is connected to the power source line PL that supplies the negative power supply voltage −Vo. Alternatively, the third electrode M3 may be formed in a comb-teeth shape so as to straddle the subpixels, and a common power supply voltage (−Vo) may be applied to the third electrode M3.

FIGS. 13(b) and 13(c) are similar to FIG. 8(b) and FIG. 10(c). When the light-emitting layer EM is in the non-light emission state, the optical adjustment element LS is in the light transmitting state, and a background is visible through the subpixel (transparent display). On the other hand, when the light-emitting layer EM is in the light emission state, the optical adjustment element LS is in the light blocking state, and the subpixel is displayed in gray levels to white gray scale. The viewing direction is one-sided, and viewing from the TFT substrate 10 side is possible. It is also possible to configure a transparent display in which the optical adjustment element LS is in the transient state when the light-emitting layer EM is at low luminance.

Third Embodiment

FIG. 14(a) is a cross-sectional view illustrating a configuration of a display device according to a third embodiment, and FIG. 14(b) is an explanatory diagram illustrating potentials of first to third electrodes according to the third embodiment. As illustrated in FIG. 14, a display device 5 includes a first member 1, a second member 2 facing the first member 1, and a liquid crystal layer 3 placed between the first member 1 and the second member 2. In the first member 1, first electrodes M1, a transparent body 23, electroluminescent (EL) layers 24, second electrodes M2, a sealing layer 26, a first polarizer Y1, and a first alignment film H1 are provided in this order on a TFT substrate 10 including multiple thin film transistors Tr. In the second member 2, a third electrode M3, a second polarizer Y2, and a second alignment film H2 are provided in this order on a counter substrate 30. In the first member 1, fourth electrodes M4 facing the third electrode M3 with the liquid crystal layer 3 interposed therebetween are provided in the same layer as the second electrodes M2 and adjacent to the second electrodes M2, respectively. The TFT substrate 10, the first electrode M1, the second electrode M2, the fourth electrode M4, the sealing layer 26, the third electrode M3, and the counter substrate 30 have a light transmitting property. The first member 1 and the second member 2 are disposed to face each other such that the first alignment film H1 and the second alignment film H2 are in contact with the liquid crystal layer 3.

In the third embodiment, provided are the transparent body 23 (edge cover film) adjacent to the light-emitting layer EM in a planar direction, the fourth electrode M4 capable of forming an electrical field between the third electrode M3 and the fourth electrode M4, and an auxiliary element FS overlapping the transparent body 23 in a plan view and having light transmittance Vu switched in accordance with a potential difference Vu between the fourth electrode and the third electrode (=a fourth electrode potential VQ−a third electrode potential VN). The fourth electrode M4 is connected to a transistor Ts of the TFT substrate 10, and its potential VQ is variable.

To be specific, the optical adjustment element LS (liquid crystal cell) is composed of the first polarizer Y1, the first alignment film H1, the liquid crystal layer 3 overlapping the light-emitting layer EM, the second alignment film H2, and the second polarizer Y2, and the auxiliary element FS (liquid crystal cell) is composed of the first polarizer Y1, the first alignment film H1, the liquid crystal layer 3 overlapping the transparent body 23, the second alignment film H2, and the second polarizer Y2.

FIG. 15(a) is a schematic view illustrating operation of the display device, FIG. 15(b) is an explanatory diagram illustrating the operation of the display device, FIG. 15(c) is a graph showing a characteristic of voltage of the optical adjustment element and transmittance, and FIG. 15(d) is a graph showing a characteristic of voltage of the auxiliary element and transmittance.

In the third embodiment, the optical adjustment element LS is placed between the second electrode M2 and the third electrode M3, and the auxiliary element FS is placed between the fourth electrode M4 and the third electrode M3. The optical adjustment element LS corresponds to a subpixel, and the auxiliary element FS corresponds to an auxiliary pixel adjacent to the subpixel.

As illustrated in FIGS. 14 and 15, in the optical adjustment element LS, a polarization axis of the first polarizer Y1 and a polarization axis of the second polarizer Y2 are orthogonal. The optical adjustment element LS is in a transient state or a light transmitting state when a potential difference Vs between the second electrode M2 and the third electrode M3 is the fourth voltage Vth4 or less, and the optical adjustment element LS is in a light blocking state when the potential difference Vs exceeds the fourth voltage Vth4.

As illustrated in FIGS. 14 and 15, in the auxiliary element FS, the polarization axis of the first polarizer Y1 and the polarization axis of the second polarizer Y2 are orthogonal. The auxiliary element FS is in a transient state or a light transmitting state when a potential difference Vu between the fourth electrode M4 and the third electrode M3 is the fourth voltage Vth4 or less, and the auxiliary element FS is in a light blocking state when the potential difference Vu exceeds the fourth voltage Vth4.

Here, Vmin+Vo is set to be greater than Vth4, and the potential VQ of the fourth electrode M4 is set high (e.g., Vmin or higher in FIG. 2) when VA is low (e.g., Vai in FIG. 2) and the potential difference Vs is Vsi (value when no current is injected into second electrode M2), while the potential VQ is set low (e.g., set to Vqi when no current is injected into the fourth electrode M4) when the potential VA is high (e.g., Vmin or higher in FIG. 2) and the potential difference Vs is Vmin+Vo or greater. As a result, when the light-emitting layer EM is in the non-light emission state, the optical adjustment element LS is in the light transmitting state (a background is visible through the subpixel) and the auxiliary element FS is in the light blocking state (auxiliary pixel is displayed in black gray scale), and when the light-emitting layer EM is in the light emission state, the optical adjustment element LS is in the light blocking state (subpixel is displayed in gray levels to white gray scale) and the auxiliary element FS is in the transient state or the light transmitting state (a background is visible through the auxiliary pixel). In the third embodiment, a viewing direction is one-sided, and viewing from a TFT substrate 10 side is possible.

When the light-emitting layer EM is in the non-light emission state and the transmittance of the optical adjustment element LS is desired to be high, Vsi is set to be equal or less than Vth3. When the light-emitting layer EM is in the non-light emission state and the transmittance of the optical adjustment element LS is desired to be low, Vsi is set to be greater than Vth3.

According to the third embodiment, in addition to the effect of the second embodiment, when the light-emitting layer EM does not emit light, external light (back light) incident on the auxiliary pixel adjacent to the subpixel (background display) can be blocked, and when the light-emitting layer EM emits light, the external light (back light) incident on the auxiliary pixel adjacent to the subpixel (gray scale display) can be transmitted. Thus, a high-contrast transparent display can be achieved.

In FIG. 15(c), Vmin+Vo is greater than Vth4, but Vmin+Vo does not have to be greater than Vth4. Vmin+Vo can be less than Vth4. This provides a transparent display in which the optical adjustment element LS is in the transient state (a background is visible) when the light-emitting layer EM is at low luminance. In addition, the transmittance of LS can be increased when the light-emitting layer EM is at low luminance, thus enabling a reduction in power consumption.

Fourth Embodiment

Figure 16:
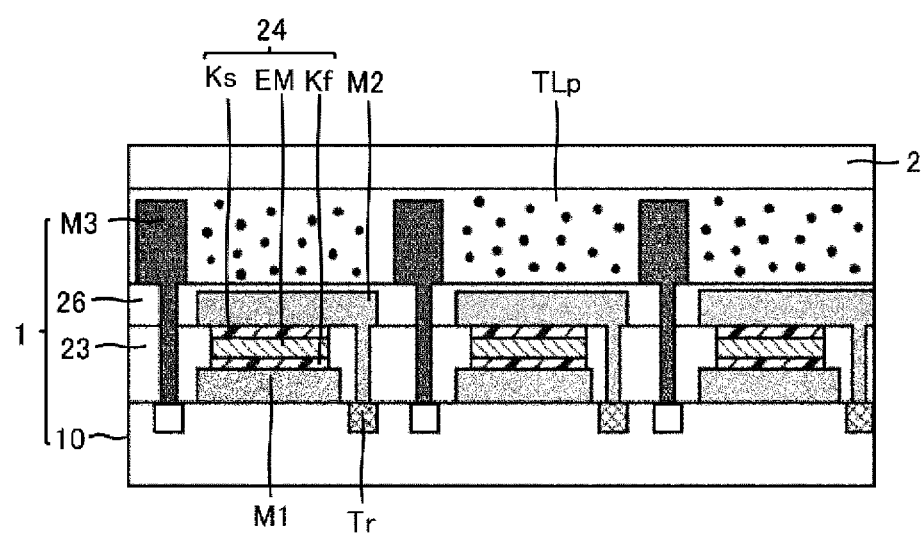
FIG. 16 is a cross-sectional view illustrating a configuration of a display device according to a fourth embodiment.

FIG. 16 is a cross-sectional view illustrating a configuration of a display device according to a fourth embodiment. As illustrated in FIG. 16, a display device 5 includes a first member 1, a second member 2 (counter substrate) facing the first member 1, and an electrophoretic optical adjustment element TLp placed between the first member 1 and the second member 2. In the first member 1, first electrodes M1, an edge cover film 23, electroluminescent (EL) layers 24, second electrodes M2, a sealing layer 26, and third electrodes M3 are provided in this order on a TFT substrate 10 including multiple thin film transistors Tr. The TFT substrate 10, the first electrode M1, the second electrode M2, the sealing layer 26, and the second member 2 have a light transmitting property. The third electrode M3 has a light blocking property and does not overlap a light-emitting region of the light-emitting layer EM.

Figure 17:
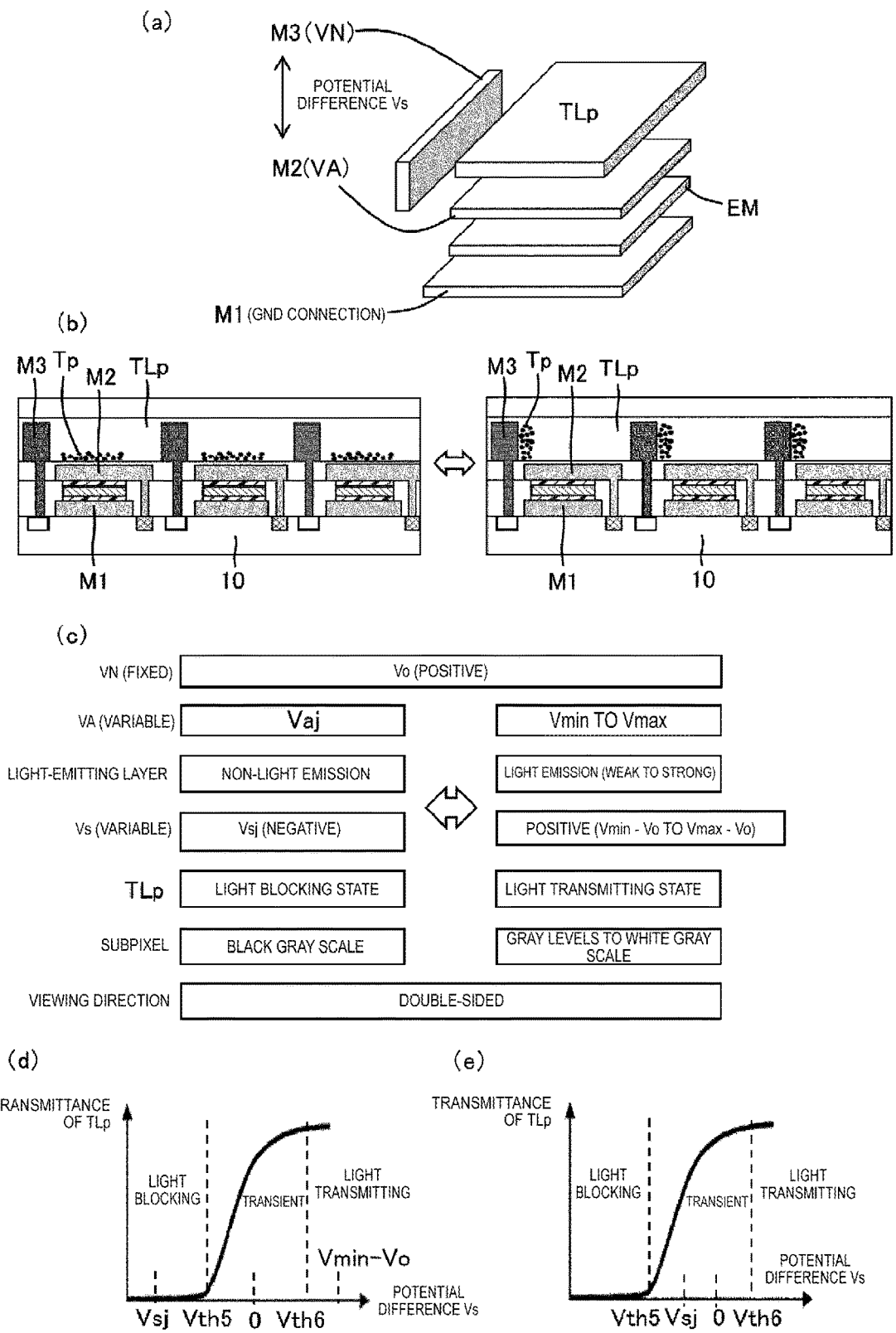
FIG. 17(a) is an explanatory diagram illustrating potentials of first to third electrodes according to the fourth embodiment.
FIG. 17(b) is a cross-sectional view illustrating operation of the display device.
FIG. 17(c) is an explanatory diagram illustrating the operation of the display device.
FIGS. 17(d) and 17(e) are graphs showing a characteristic of voltage of an optical adjustment element and transmittance.

FIG. 17(a) is an explanatory diagram illustrating potentials of the first to third electrodes according to the fourth embodiment, FIG. 17(b) is a cross-sectional view illustrating operation of the display device, FIG. 17(c) is an explanatory diagram illustrating the operation of the display device, and FIGS. 17(d) and 17(e) are graphs showing a characteristic of voltage of the optical adjustment element and transmittance. In FIG. 17, a potential difference Vs is obtained by subtracting a potential VN of the third electrode M3 from a potential VA of the second electrode M2. The potential VA of the second electrode M2 is variable and the potential VN of the third electrode M3 is fixed. Since a power supply voltage Vo is applied between the first electrode M1 and the third electrode M3, and the first electrode M1 is grounded, the potential VN of the third electrode M3 is a value of Vo itself (positive). The potential VA of the second electrode M2 is a value of a potential difference Va itself between the first electrode M1 and the second electrode M2. The potential difference Va when no current is injected (no voltage is applied) to the second electrode M2 is a divided voltage value Vaj determined by Equation 4 below based on a capacitance ratio between an element capacitance Ce and an electrophoretic layer capacitance Cj.

$$Vaj = Vo \times Ce/(Ce+Cj)$$ [Equation 4]

Thus, when no current is injected into the second electrode M2, a value Vsj of the potential difference Vs is Vo×Cj/(Ce+Cj), and when VA is Vmin or higher, the potential difference Vs is a positive value of Vmin−Vo or greater.

The optical adjustment element TLp is an electrophoretic layer containing toner Tp having a positive charge. The optical adjustment element TLp is in a light blocking state when the potential difference Vs is negative, and is in a light transmitting state when the potential difference Vs is positive.

States of the optical adjustment element TLp include a light transmitting state in which the toner Tp gathers near a side surface of the third electrode M3 and does not overlap the light-emitting layer in a plan view, a light blocking state in which the toner Tp gathers near an upper surface of the second electrode M2 and overlaps the light-emitting layer in a plan view, and a transient state from the light blocking state to the light transmitting state. When the toner Tp gathers near the side surface of the third electrode M3, the toner Tp may or may not be in contact with the side surface. When the toner is not in contact with the side surface of the third electrode M3, a distance between the side surface and a particle of the toner Tp closest to the side surface is substantially the same as a distance between particles of the toner Tp. When the toner Tp gathers near the upper surface of the second electrode M2, the toner Tp may or may not be in contact with the upper surface. When the toner is not in contact with the upper surface of the second electrode M2, a distance between the upper surface and a particle of the toner Tp closest to the upper surface is substantially the same as a distance between particles of the toner Tp.

For the potential difference Vs, a threshold value from the light blocking state (the state in which the toner Tp gathers near the upper surface of the second electrode M2 and overlaps the light-emitting layer in a plan view) to the transient state (the state in which some of the toner Tp is away from the upper surface of the second electrode M2) is a fifth voltage Vth5 (<0), and a threshold value from the transient state to the light transmitting state (the state in which the toner Tp gathers near the side surface of the third electrode M3 and does not overlap the light-emitting layer in a plan view) is a sixth voltage Vth6 (>0). Although the fifth voltage Vth5 and the sixth voltage Vth6 are never both 0, one of the fifth voltage Vth5 and the sixth voltage Vth6 may be 0.

As shown in FIG. 17(d), by setting Vsj to be less than the fifth voltage Vth5 and setting the potential difference Vs (=Vmin−Vo) when the potential VA is Vmin to be greater than the fifth voltage Vth5, when no current is injected into the second electrode M2, the optical adjustment element TLp is in the light blocking state, and when the potential VA is Vmin or higher, the optical adjustment element TLp is in the transient state or the light transmitting state. As an example, Vo=1.0 [V], Vth5=0.0 [V], Vmin=2.0 [V], and Vmax=5.0 [V] are assumed. Usually, the light-emitting layer EM has a relative dielectric constant εe of about 8.0 and a film thickness De of about 50 nm, and the optical adjustment element TLp has a relative dielectric constant εj of about 7.0 and a film thickness Dj of about 25 μm. Equation 5 holds for the electrophoretic layer capacitance Cj.

$$Cj = \varepsilon 0 \times \varepsilon j \times S/Dj \qquad \text{[Equation 5]}$$

From Equations 2, 4, and 5, when no current is injected into the second electrode M2, Vaj is 0.998 V and Vsj is −0.002 V, which is negative value smaller than Vth5. When Vmin is applied to the second electrode M2, Vs is Vmin-Vo and is 1.0 V, which is a positive value larger than Vth5.

In this way, when the light-emitting layer EM is in a non-light emission state (non-light emission period), the optical adjustment element TLp is in the light blocking state and the subpixel is displayed in black gray scale, and when the light-emitting layer EM is in a light emission state (light emission period), the optical adjustment element TLp is in the light transmitting state and the subpixel is displayed in gray levels to white gray scale. In the fourth embodiment, a viewing direction is double-sided, so that viewing from a TFT substrate 10 side and viewing from a counter substrate 30 side are possible.

When the light-emitting layer EM has low luminance and the transmittance of the optical adjustment element TLp is desired to be high, Vmin−Vo is set to be equal to or greater than Vth6. When the light-emitting layer EM has low luminance and the transmittance of the optical adjustment element TLp is desired to be low, Vmin−Vo is set to be less than Vth6.

According to the fourth embodiment, when the light-emitting layer EM is in the light emission state (light emission period), the optical adjustment element TLp is autonomously in the transient state or the light transmitting state, and when the light-emitting layer EM is in the non-light emission state (non-light emission period), the optical adjustment element TLp is autonomously in the light blocking state (blocks back light). Thus, a high-contrast double-sided display capable of black gray scale display can be achieved.

In FIG. 17(d), Vsj is less than Vth5, but Vsj does not have to be less than Vth5. As shown in FIG. 17(e), Vsj can be greater than Vth5. This provides a transparent display in which the optical adjustment element TLp is in the transient state (a background is visible) when the light-emitting layer EM is in the non-light emission state.

Fifth Embodiment

Figure 18:
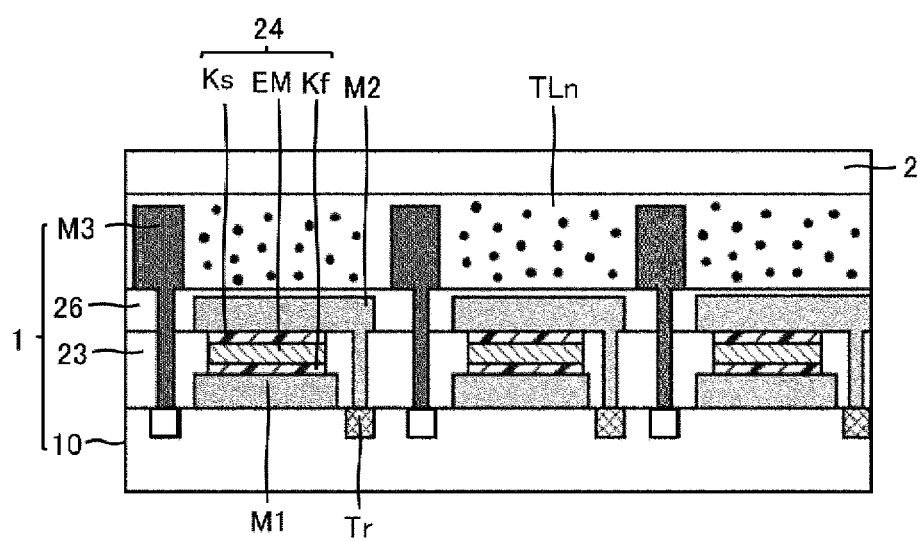
FIG. 18 is a cross-sectional view illustrating a configuration of a display device according to a fifth embodiment.

FIG. 18 is a cross-sectional view illustrating a configuration of a display device according to a fifth embodiment. As illustrated in FIG. 18, a display device 5 includes a first member 1, a second member 2 (counter substrate) facing the first member 1, and an optical adjustment element TLn (electrophoretic layer) filled between the first member 1 and the second member 2. In the first member 1, first electrodes M1, an edge cover film 23, electroluminescent (EL) layers 24, second electrodes M2, a sealing layer 26, and third electrodes M3 are provided in this order on a TFT substrate 10 including multiple thin film transistors Tr. The TFT substrate 10, the first electrode M1, the second electrode M2, the sealing layer 26, and the second member 2 have a light transmitting property. The third electrode M3 has a light blocking property and does not overlap a light-emitting region of the light-emitting layer EM.

Figure 19:
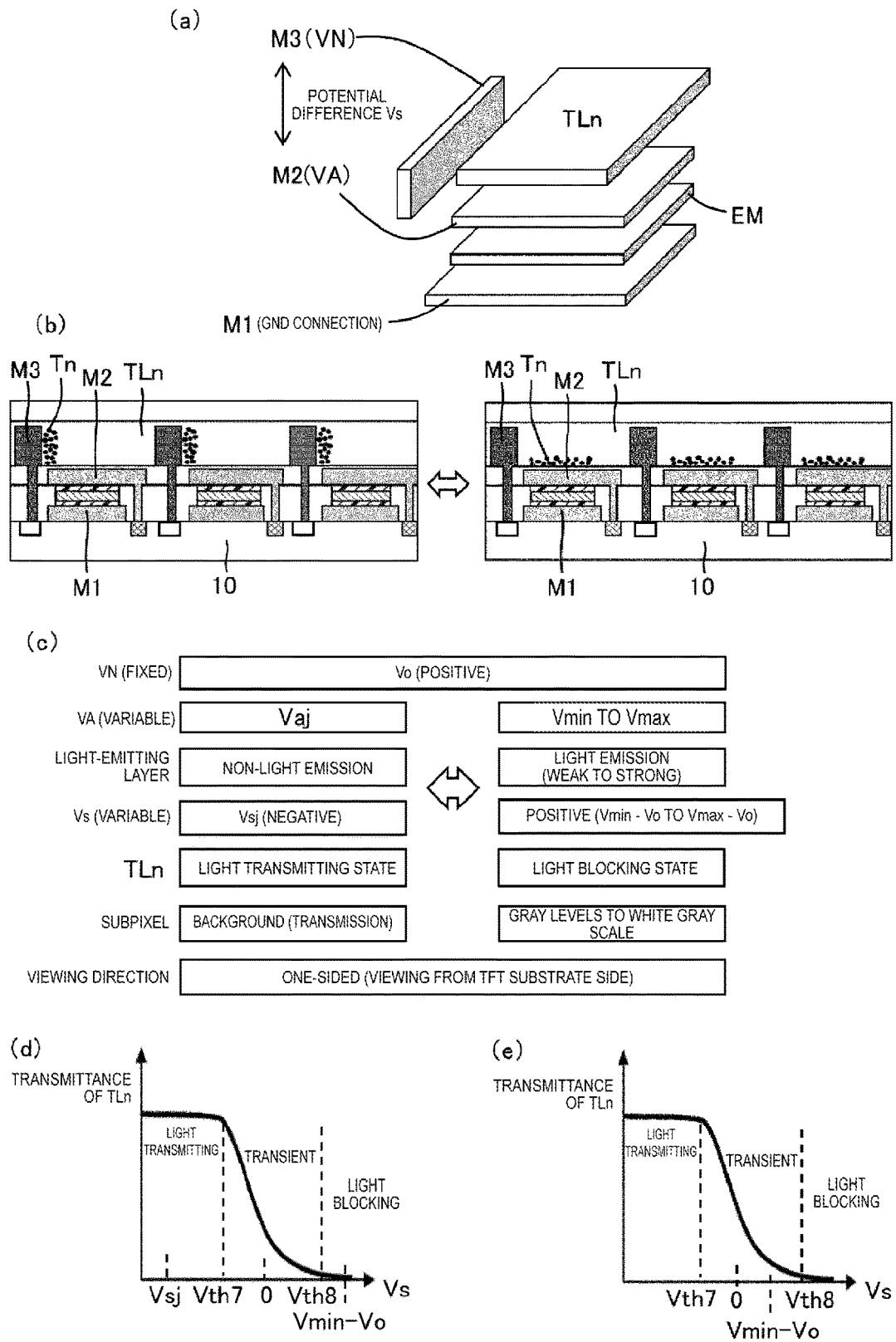
FIG. 19(a) is an explanatory diagram illustrating potentials of first to third electrodes according to the fifth embodiment.
FIG. 19(b) is a cross-sectional view illustrating operation of the display device.
FIG. 19(c) is an explanatory diagram illustrating the operation of the display device.
FIGS. 19(d) and 19(e) are graphs showing a characteristic of voltage of an optical adjustment element and transmittance.

FIG. 19(a) is an explanatory diagram illustrating potentials of the first to third electrodes according to the fifth embodiment, FIG. 19(b) is a cross-sectional view illustrating operation of the display device, FIG. 19(c) is an explanatory diagram illustrating the operation of the display device, and FIGS. 19(d) and 19(e) are graphs showing a characteristic of voltage of the optical adjustment element and transmittance. In FIG. 19, a potential difference Vs is obtained by subtracting a potential VN of the third electrode M3 from a potential VA of the second electrode M2. The potential VN of the third electrode M3 is fixed at Vo (positive).

The optical adjustment element TLn is an electrophoretic layer containing toner Tn having a negative charge. The optical adjustment element TLn is in a light transmitting state when the potential difference Vs is negative, and is in a light blocking state when the potential difference Vs is positive.

States of the optical adjustment element TLn include a light transmitting state in which the toner Tn gathers near a side surface of the third electrode M3, a light blocking state in which the toner Tn gathers near an upper surface of the second electrode M2, and a transient state from the light blocking state to the light transmitting state. For the potential difference Vs, a threshold value from the light transmitting state to the transient state is a seventh voltage Vth7 (<0), and a threshold value from the transient state to the light blocking state is an eighth voltage Vth8 (>0).

As shown in FIG. 19(d), by setting the potential difference Vs (=Vmin−Vo) when the potential VA is Vmin to be greater than the eighth voltage Vth8 and setting a value Vsj of the potential difference Vs when no current is injected into the second electrode M2 to be less than 0, the optical adjustment element TLn is in the transient state or the light transmitting state unless current is injected into the second electrode M2 and the optical adjustment element TLn is in the light blocking state when the potential VA is Vmin or higher.

In this way, when the light-emitting layer EM is in a non-light emission state, the optical adjustment element TLn is in the light transmitting state and a background is visible through the subpixel (transparent display), and when the light-emitting layer EM is in a light emission state, the optical adjustment element TLn is in the light blocking state and the subpixel is displayed in gray levels to white gray scale. In the fifth embodiment, a viewing direction is one-sided, and viewing from a TFT substrate 10 side is possible.

When the light-emitting layer EM is in the non-light emission state and the transmittance of the optical adjustment element TLn is desired to be high, Vsj is set to be equal to or less than Vth7. When the light-emitting layer EM is in the non-light emission state and the transmittance of the optical adjustment element TLn is desired to be low, Vsj is set to be greater than Vth7 and less than 0.

According to the fifth embodiment, when the light-emitting layer EM is in the non-light emission state, the optical adjustment element TLn is autonomously in the transient state or the light transmitting state, and when the light-emitting layer EM is in the light emission state, the optical adjustment element TLn is autonomously in the light blocking state (blocks back light). Thus, a high-contrast transparent display can be achieved by blocking external light (back light) incident on the light-emitting layer EM during light emission.

In FIG. 19(d), Vmin–Vo is greater than Vth8, but Vmin–Vo does not have to be greater than Vth8. As shown in FIG. 19(e), Vmin–Vo can be less than Vth8. This provides a transparent display in which the optical adjustment element TLn is in the transient state (a background is visible) when the light-emitting layer EM is at low luminance. In addition, transmittance of TLn can be increased when the light-emitting layer EM is at low luminance, thus enabling a reduction in power consumption.

In each of the embodiments described above, the electroluminescence of the light-emitting layer EM between the first electrode M1 and the second electrode M2 is exemplified. However, as a modified example, a photoluminescent layer (PL layer) can be provided between the second electrode and the optical adjustment element in addition to the light-emitting layer EM. The PL layer contains, for example, quantum dots and has an optical wavelength conversion function by photoluminescence. The optical wavelength conversion function is a function of absorbing short wavelength light (e.g., blue light) and emitting long wavelength light (e.g., red light or green light). According to this configuration, the PL layer is excited by light emitted by the light-emitting layer EM, and light having a wavelength longer than the light emission wavelength of the light-emitting layer EM can be emitted. The PL layer is placed closer to a viewing surface than the first electrode M1, the second electrode M2, and the light-emitting layer EM in the subpixel including the PL layer. This is to prevent a viewer from directly viewing light from the light-emitting layer EM in the subpixel. Although the PL layer contains quantum dots in the above description, the PL layer does not necessarily contain quantum dots. The PL layer can be made of any material as long as it has an optical wavelength conversion function. To be specific, a fluorescent substrate, a phosphorescent substrate, or the like can be used as the material of the PL layer. The light-emitting layer EM may be made of any material as long as electroluminescence is caused.

The embodiments described above are for the purpose of illustration and description and are not intended to be limiting. It will be apparent to those skilled in the art that many variations will be possible in accordance with these examples and descriptions.

Supplement

First Aspect

A display device includes a light-emitting element including a first electrode and a second electrode overlapping each other in a plan view, and a light-emitting layer placed between the first electrode and the second electrode, a third electrode capable of forming an electrical field between the second electrode and the third electrode, and an optical adjustment element overlapping the light-emitting layer in a plan view and having light transmittance that changes in accordance with a potential difference between the second electrode and the third electrode.

Second Aspect

In the display device according to, for example, the first aspect, the optical adjustment element is in one of multiple optical states in accordance with the potential difference.

Third Aspect

In the display device according to, for example, the first aspect or the second aspect, in a case the potential difference exceeds a first voltage, the optical adjustment element switches from a light blocking state to a transient state, and in a case the potential difference exceeds a second voltage, the optical adjustment element switches from the transient state to a light transmitting state.

Fourth Aspect

In the display device according to, for example, the third aspect, during a non-light emission period of the light-emitting layer, the optical adjustment element is in the light blocking state or the transient state, and during a light emission period of the light-emitting layer, the optical adjustment element is in the transient state or the light transmitting state.

Fifth Aspect

In the display device according to, for example, the first aspect or the second aspect, in a case the potential difference exceeds a third voltage, the optical adjustment element switches from a light transmitting state to a transient state, and in a case the potential difference exceeds a fourth voltage, the optical adjustment element switches from the transient state to the light blocking state.

Sixth Aspect

In the display device according to, for example, the fifth aspect, during the non-light emission period of the light-emitting layer, the optical adjustment element is in the light transmitting state or the transient state, and during the light emission period of the light-emitting layer, the optical adjustment element is in the transient state or the light blocking state.

Seventh Aspect

In the display device according to, for example, the fourth aspect or the sixth aspect, a potential of the first electrode and a potential of the third electrode are fixed.

Eighth Aspect

In the display device according to, for example, the seventh aspect, a potential of the second electrode during the light emission period is higher than a potential of the second electrode during the non-light emission period.

Ninth Aspect

In the display device according to, for example, the seventh aspect, the potential of the first electrode is equal to or greater than the potential of the third electrode.

Tenth Aspect

In the display device according to, for example, the fourth aspect, the optical adjustment element includes a liquid crystal layer, and a first polarizer and a second polarizer having polarization axes parallel to each other, and the liquid crystal layer is placed between the first polarizer and the second polarizer.

Eleventh Aspect

In the display device according to, for example, the 10th aspect, the optical adjustment element is in the light blocking state in a case the liquid crystal layer rotates a polarization direction of light by 90 degrees.

Twelfth Aspect

In the display device according to, for example, the sixth aspect, the optical adjustment element includes a liquid crystal layer, and a first polarizer and a second polarizer having polarization axes orthogonal to each other, and the liquid crystal layer is placed between the first polarizer and the second polarizer.

Thirteenth Aspect

The display device according to, for example, the 12th aspect, the optical adjustment element is in the light blocking state in a case the liquid crystal layer does not change a polarization direction of light.

Fourteenth Aspect

The display device according to, for example, the sixth aspect, further includes a transparent body adjacent to the light-emitting layer in a planar direction, a fourth electrode capable of forming an electrical field between the third electrode and the fourth electrode, and an auxiliary element overlapping the transparent body in a plan view and has light transmittance switched in accordance with a potential difference between the fourth electrode and the third electrode.

Fifteenth Aspect

In the display device according to, for example, the 14th aspect, during the non-light emission period of the light-emitting layer, the auxiliary element is in a light blocking state, and during the light emission period of the light-emitting layer, the auxiliary element is in a light transmitting state.

Sixteenth Aspect

In the display device according to, for example, the 15th aspect, a potential of the first electrode and a potential of the third electrode are fixed, a potential of the second electrode in the light emission period is higher than a potential of the second electrode in the non-light emission period, and a potential of the fourth electrode in the light emission period is lower than a potential of the fourth electrode in the non-light emission period.

Seventeenth Aspect

The display device according to, for example, any one of the 10th to the 13th aspects, includes a TFT substrate including a thin film transistor and provided under the first electrode and the second electrode, in which the third electrode is provided above the first electrode and the second electrode, and the liquid crystal layer is placed between the second electrode and the third electrode.

Eighteenth Aspect

In the display device according to, for example, the 17th aspect, between the second electrode and the third electrode, the first polarizer and the second polarizer are disposed.

Nineteenth Aspect

In the display device according to, for example, the 17th aspect, the first polarizer is placed under the TFT substrate, and between the second electrode and the third electrode, the second polarizer is placed.

Twentieth Aspect

In the display device according to, for example, the 17th aspect, between the second electrode and the third electrode, the first polarizer is placed, and the second polarizer is placed above the third electrode.

Twenty-First Aspect

In the display device according to, for example, the 17th aspect, the first polarizer is placed under the TFT substrate, and the second polarizer is placed above the third electrode.

Twenty-Second Aspect

In the display device according to, for example, the 17th aspect, the TFT substrate, the first electrode, the second electrode, and the third electrode have a light transmitting property.

Twenty-Third Aspect

In the display device according to, for example, the 10th or the 12th aspect, the second electrode and the third electrode are provided adjacent to each other in a planar direction, and the liquid crystal layer adopts a transverse electrical field control mode.

Twenty-Fourth Aspect

In the display device according to, for example, the first or the second aspect, the optical adjustment element is an electrophoretic layer containing toner movable by an electrical field between the second electrode and the third electrode.

Twenty-Fifth Aspect

In the display device according to, for example, the 24th aspect, in a case the toner overlaps the light-emitting layer in a plan view, the optical adjustment element is in a light blocking state, and in a case the toner does not overlap the light-emitting layer in a plan view, the optical adjustment element is in a light transmitting state.

Twenty-Sixth Aspect

In the display device according to, for example, the 25th aspect, in a case the potential difference exceeds a fifth voltage, the optical adjustment element switches from the light blocking state to a transient state, and in a case the potential difference exceeds a sixth voltage, the optical adjustment element switches from the transient state to the light transmitting state.

Twenty-Seventh Aspect

In the display device according to, for example, the 26th aspect, during a non-light emission period of the light-emitting layer, the optical adjustment element is in the light blocking state or the transient state, and during a light emission period of the light-emitting layer, the optical adjustment element is in the transient state or the light transmitting state.

Twenty-Eighth Aspect

In the display device according to, for example, the 25th aspect, in a case the potential difference exceeds a seventh voltage, the optical adjustment element switches from the light transmitting state to a transient state, and in a case the potential difference exceeds an eighth voltage, the optical adjustment element switches from the transient state to the light blocking state.

Twenty-Ninth Aspect

In the display device according to, for example, the 28th aspect, during a non-light emission period of the light-emitting layer, the optical adjustment element is in the light transmitting state or the transient state, and during a light emission period of the light-emitting layer, the optical adjustment element is in the transient state or the light blocking state.

Thirtieth Aspect

The display device according to, for example, any one of the 1st to the 29th aspects, includes a first subpixel configured to emit red light, a second subpixel configured to emit green light, and a third subpixel configured to emit blue light, in which each of the first subpixel, the second subpixel, and the third subpixel includes the light-emitting element and the optical adjustment element, and the third electrode is common to the first subpixel, the second subpixel, and the third subpixel.

The invention claimed is:

1. A display device comprising:
a light-emitting element including a first electrode and a second electrode overlapping each other in a plan view, and a light-emitting layer placed between the first electrode and the second electrode;
a third electrode capable of forming an electrical field between the second electrode and the third electrode;
an optical adjustment element overlapping the light-emitting layer in the plan view and having light transmittance that changes based on a potential difference between the second electrode and the third electrode;
a transparent body adjacent to the light-emitting layer in a planar direction;
a fourth electrode capable of forming an electrical field between the third electrode and the fourth electrode; and
an auxiliary element overlapping the transparent body in the plan view and having light transmittance switched based on a potential difference between the fourth electrode and the third electrode,
wherein in a case that the potential difference exceeds a first voltage, the optical adjustment element switches from a light transmitting state to a transient state,
in a case that the potential difference exceeds a second voltage, the optical adjustment element switches from the transient state to a light blocking state,
during a non-light emission period of the light-emitting layer, the optical adjustment element is in the light transmitting state or the transient state, and
during a light emission period of the light-emitting layer, the optical adjustment element is in the transient state or the light blocking state.

2. The display device according to claim 1,
wherein, during the non-light emission period of the light-emitting layer, the auxiliary element is in a light blocking state, and
during the light emission period of the light-emitting layer, the auxiliary element is in a light transmitting state.

3. The display device according to claim 2,
wherein a potential of the first electrode and a potential of the third electrode are fixed,
a potential of the second electrode in the light emission period is higher than a potential of the second electrode in the non-light emission period, and
a potential of the fourth electrode in the light emission period is lower than a potential of the fourth electrode in the non-light emission period.

* * * * *